(12) United States Patent
Sumigawa et al.

(10) Patent No.: US 7,484,422 B2
(45) Date of Patent: Feb. 3, 2009

(54) MECHANICAL-QUANTITY MEASURING DEVICE

(75) Inventors: Takashi Sumigawa, Fukuoka (JP); Hiroyuki Ohta, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 39 days.

(21) Appl. No.: 11/350,109

(22) Filed: Feb. 9, 2006

(65) Prior Publication Data
US 2006/0207339 A1    Sep. 21, 2006

(30) Foreign Application Priority Data
Mar. 18, 2005    (JP) ............................. 2005-078376

(51) Int. Cl.
*G01B 7/16* (2006.01)
(52) U.S. Cl. .................... 73/777; 73/760; 73/761; 73/763; 73/774
(58) Field of Classification Search .............. 73/760, 73/761, 763, 774, 777
See application file for complete search history.

(56) References Cited

U.S. PATENT DOCUMENTS 5,313,836 A * 5/1994 Fujii et al. ............... 73/514.16
5,583,295 A * 12/1996 Nagase et al. ................. 73/708
6,988,412 B1 * 1/2006 Wilner ......................... 73/754
7,109,568 B2 * 9/2006 Kumagai et al. ............ 257/627
7,146,865 B2 * 12/2006 Wilner .................. 73/862.627

FOREIGN PATENT DOCUMENTS

JP    07-270109    10/1995

* cited by examiner

*Primary Examiner*—Edward Lefkowitz
*Assistant Examiner*—Freddie Kirkland, III
(74) *Attorney, Agent, or Firm*—Antonelli, Terry, Stout & Kraus, LLP.

(57) ABSTRACT

A mechanical-quantity measuring device capable of measuring a strain component of structure deformation for an object to be measured in a particular desired direction with long life, high reliability and high precision. A strain sensor is formed on a semiconductor substrate. Impurity-diffused layers considering the crystal orientation of the semiconductor single crystalline substrate are used to form a Wheatstone bridge circuit on the substrate. The Wheatstone bridge circuit can operate on one substrate since the semiconductor single crystal has the anisotropy of piezoresistance effect.

9 Claims, 21 Drawing Sheets

FIG. 1
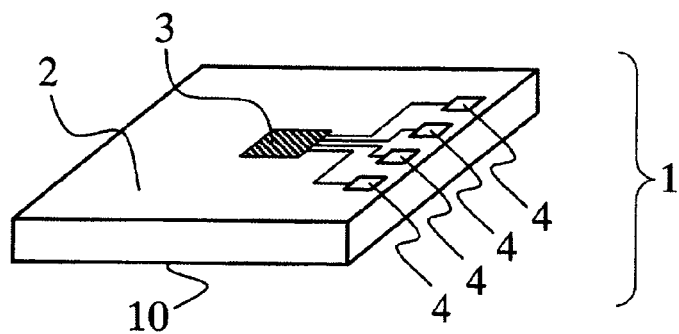
FIG. 2A       FIG. 2B       FIG. 2C
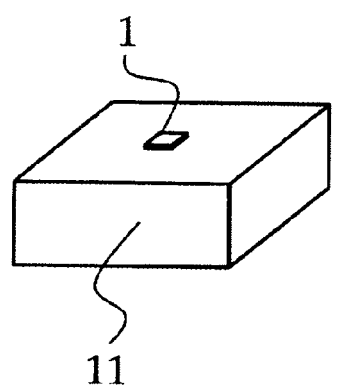 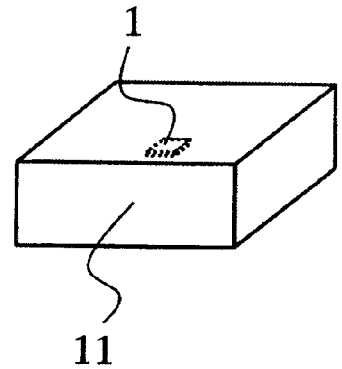 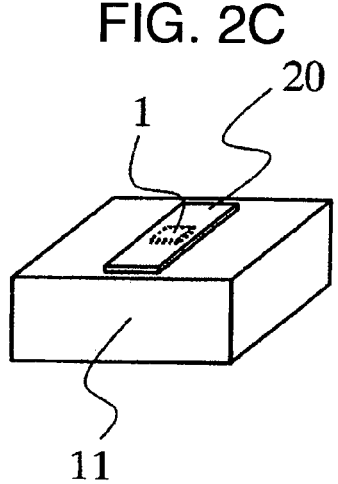
FIG. 3
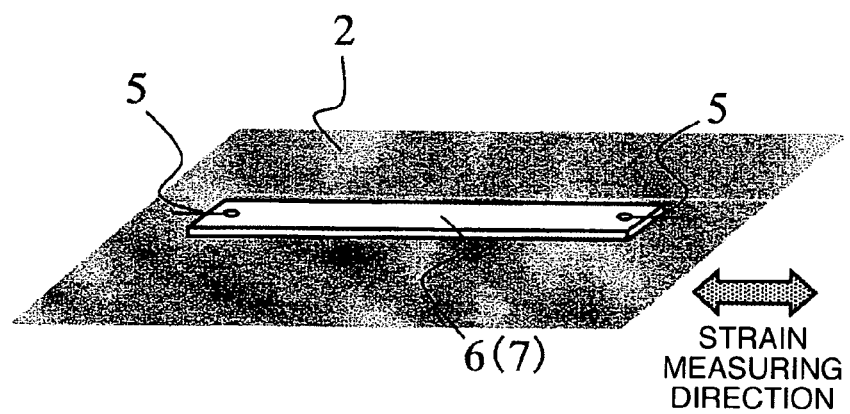

STRAIN MEASURING DIRECTION

STRAIN MEASURING DIRECTION

MECHANICAL-QUANTITY MEASURING DEVICE

BACKGROUND OF THE INVENTION

The present invention relates to a mechanical-quantity measuring device.

In order to measure the deformation of a structure, a metal-foil strain gauge is used that utilizes the fact that the resistance of a metal foil changes due to strain. In addition, as disclosed in JP-A-07-270109, a bridge circuit is used together with the strain gauge in order to make the temperature compensation.

SUMMARY OF THE INVENTION

For the measurement of strain, a metal-foil strain gauge or a semiconductor strain gauge having fine lines of polysilicon thin film has been used so far. The thin films of the metal-foil gauge or semiconductor strain gauge are formed on a film made of a resin material such as polyimide. In addition, a bridge box is used together with the strain gauge to form a Wheatstone bridge for the measurement of strain. The Wheatstone bridge circuit is formed of four resistors of an equal resistance and serves as a temperature compensation circuit. In this case, only the strain gauge for the measurement of strain is attached to an object being measured, and the resistors within the bridge box are located in a place where there is no effect of strain. However, when the metal foil gauge or semiconductor strain gauge is tried to use for the strain measurement, the following inherent problem is caused.

First, since the linear expansion coefficient of the metal foil or polysilicon thin film used for the strain gauge is different about one digit, or ten times from that of the resin, a temperature change at the time of strain measurement will cause a thermal stress in the interface between the thin film and the resin with the result that the thin film might be peeled off or broken. Thus, the reliability is low from the standpoint of mechanical strength. Accordingly, it is an objective of the invention to provide a mechanical quantity measuring device capable of suppressing the thermal stress between the thin film and the substrate, thereby enabling the strain sensor to measure strain with high precision even when it has the metal foil or polysilicon thin film.

Secondly, if a polysilicon material is used in the strain sensor, grain boundaries will exist in the strain sensor, thus giving rise to stress migration and intergranular corrosion to greatly reduce the strength. In order to prevent the strength from being reduced due to such intergranular corrosion, it is necessary to use a single crystal material that will have no grain boundary if it is used in the strain sensor. The strain sensor can be made of a single crystal material by, for example, a method of locally diffusing impurity atoms into particular regions of a single crystal semiconductor substrate to form impurity-diffused resistors in those regions. Since the semiconductor has the piezoresistance effect that the resistance is changed with an applied strain, the impurity-diffused resistors can be used as the strain sensor to measure the strain. However, when the impurity-diffused layers are formed in the single crystal to build the strain sensor, the determination for the strain-measuring direction due to the resistance shapes cannot be made unlike the case of the strain gauge. Thus, since the resistors of the strain sensor change depending on the multidirectional strains, the resistors cannot detect only the strain in a desired particular direction. Accordingly, it is another objective of the invention to provide a mechanical-quantity measuring device capable of precisely measuring the strain in a particular direction even when the impurity-diffused layers of semiconductor single crystal are used in the strain sensor.

Thirdly, in order to enhance the performance of the temperature compensation of the Wheatstone bridge circuit, it is necessary that all the resistors constituting the Wheatstone bridge circuit be placed in an equal-temperature environment. For the measurement using the strain gauge, a Wheatstone bridge is generally used that is composed of the strain gauge as an active resistor for the strain measurement and a bridge box having dummy resistors with no sensitivity to strain. In this case, the ambient temperature of the strain gauge attached directly to the object being measured cannot be strictly made equal to that of the bridge box installed in a place that is isolated so that any strain cannot be applied. In addition, since the Wheatstone bridge circuit also includes the resistances of wiring conductors themselves that affect the strain measurement, it is necessary that the kinds and lengths of the wiring conductors connecting the resistors be made as equal as possible. However, a difficulty occurs when we try to make the lengths and resistances of the wiring conductors that connect the attached strain gauge of the measured object to the bridge box equal to those of the wiring conductors that connect the resistors within the bridge box. For such reasons, the conventional measuring method could not make maximum use of the performance of the temperature compensation of the Wheatstone bridge circuit. This problem can be solved by providing the Wheatstone bridge circuit within the strain sensor itself that is attached to the measured object. The temperature compensation effect of the Wheatstone bridge circuit can be intensified by shortening the lengths of the wiring conductors so that the resistors constituting the Wheatstone bridge circuit can be connected as close to each other as possible. However, when the Wheatstone bridge circuit is all formed within the strain sensor that is subjected to stain due to stress, all the resistors constituting the bridge circuit are subjected to strain and thus change in their resistances. Thus, a strain-free environment that would be established as in the dummy resistors cannot be created within the bridge box, and hence the Wheatstone bridge circuit cannot normally operate. Accordingly, it is still another objective of the invention to provide a mechanical-quantity measuring device capable of integrating the Wheatstone bridge circuit within the strain sensor so that the Wheatstone bridge circuit integrated with the strain sensor can satisfactorily function and measure the strain with high precision.

In order to achieve the above objectives, a metal thin film or polysilicon thin film is deposited on the semiconductor substrate to reduce the thermal stress in the interface between the thing film and the substrate.

In addition, in order to eliminate the effect of the presence of the grain boundaries on the strength, the substrate is made of a semiconductor single crystal, and the strain sensor is formed of impurity-diffused layers on the semiconductor single crystal substrate. Moreover, the impurity-diffused layers are formed so that current can be caused to flow chiefly along a particular crystal orientation of the semiconductor single crystal substrate, and the measuring direction is also set to be close to the particular crystal orientation.

Moreover, within the semiconductor single crystalline substrate, an active resistor formed of a metal thin film or polysilicon thin film is combined with dummy resistors made of semiconductor impurity-diffused layers to form the Wheatstone bridge circuit as a temperature compensation circuit so that the strain component in the particular direction can be measured with high precision.

Furthermore, at least two or more Wheatstone bridge circuits formed of impurity-diffused layers are provided within the semiconductor single crystal substrate so that the strain component in the particular direction can be separated from the strains.

Since the semiconductor process can be used to produce this device, other circuits such as CPU, memory circuits and communication circuits can be built in together with this device. Also, semiconductor-manufacturing facilities can be used to mass-produce this device with high precision and low cost.

BRIEF DESCRIPTION OF THE DRAWINGS

FIG. 1 is a schematic diagram of a mechanical-quantity measuring device of the first embodiment according to the invention.

FIGS. 2A, 2B and 2C are schematic diagrams showing a method of measuring by using the mechanical-quantity measuring device according to the invention.

FIG. 3 is a diagram showing the strain sensor of the mechanical-quantity measuring device of a first embodiment of the invention.

DETAILED DESCRIPTION OF THE EMBODIMENTS

Figure 4:
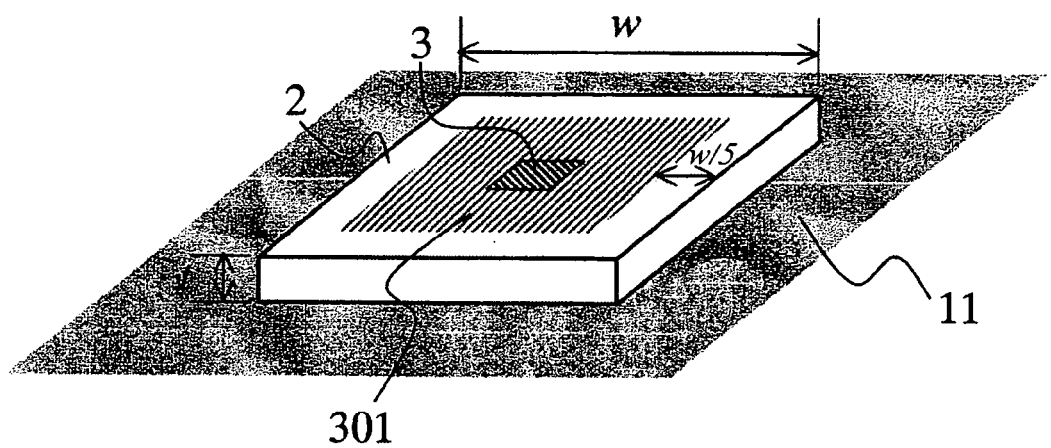
FIG. 4 is a diagram showing the location of the strain sensor of the mechanical-quantity measuring device of the first embodiment according to the invention.

Embodiments of the invention will be described with reference to the accompanying drawings.

Embodiment 1

FIG. 1 shows a mechanical-quantity measuring device of the first embodiment according to the invention. In this embodiment, at least a strain sensor 3 is formed on a silicon substrate 2. This strain sensor 3 is made of a polysilicon thin film or a metal thin film. Shown at 4 are output pads.

In this embodiment, the silicon substrate 2 and a group of thin films formed on the silicon substrate 2 are collectively called the mechanical-quantity measuring device 1.

The mechanical-quantity measuring device 1 has an adhesive surface 10 on the rear side of the silicon substrate 2 opposite to the surface on which the thin film group of the strain sensor 3 and so on is provided, or to the device-formed surface as shown in FIG. 1. The adhesive surface 10 of the mechanical-quantity measuring device 1 is bonded to the surface of a measured object 11 as illustrated in FIG. 2A so that the distortion of the measured object 11 can be measured. Alternatively, the mechanical-quantity measuring device 1 may be completely or partially buried within the measured object 11 as illustrated in FIG. 2B. Also, the mechanical-quantity measuring device 1 may be formed on or attached to or buried within a resin film 20, and then this resin film 20 with the device 1 may be attached to or buried within the measured object 11 to measure the distortion. While the mechanical-quantity measuring device 1 is attached to the measured object 11 as an example of this embodiment, the same effect can be achieved even if the mechanical-quantity measuring device 1 is buried within the measured object 11 or if the resin film 20 with the device 1 is attached to or buried within the measured object 11. The strain of the measured object 11 is transmitted to the strain sensor 3 from the adhesion surface 10 through the silicon substrate. The strain sensor 3 produces an output proportional to the amount of strain applied to the measured object.

FIG. 3 shows the mechanical-quantity measuring device of this embodiment that can solve the previously given problem. In this embodiment, the strain sensor 3 is a thin-line shaped resistor made of a metal thin film 6 or polysilicon film 7. When a strain is transmitted to the resistor, the change of the resistance of thin film 6 or 7 is measured, and hence the amount of strain is detected.

In the prior art, a metal thin film or polysilicon thin film is formed on a film of a resin such as polyimide, and the amount of strain is detected from the change of the resistance due to the strain. However, since there is a large difference between the linear expansion coefficients of the metal thin film and polyimide or of the polysilicon thin film and polyimide, a great stress is concentrated in the grain boundaries between the polyimide and the thin film under the environment in which the temperature is easy to change. Thus, the thin film might be peeled off or broken depending on the environment or after a long-period operation, leading to unreliable measurement.

In this embodiment, however, since the linear expansion coefficient of silicon substrate 2 is substantially equal to that of the metal thin film or polysilicon thin film, it is possible to reduce the concentration of stress in the grain boundaries between the silicon substrate 2 and the metal thin film 6 or between the silicon substrate 2 and the polysilicon thin film 7 even if the ambient temperature is changed. Thus, the mechanical damage can be suppressed from occurring near the grain boundaries. Therefore, this embodiment is able to measure the strain with high reliability over a long period of time even if the ambient temperature is greatly changed.

In addition, when a metal thin film or polysilicon film is formed on a thin film of a resin such as polyimide, it is not possible to follow an abrupt temperature change due to the poor thermal conductivity of the resin thin film. In this embodiment, however, the silicon substrate 2 with good thermal conductivity is used to enable the strain measurement to make with high precision even under the abrupt temperature change.

Moreover, when the polysilicon thin film 7 is used for the strain sensor 3, low power consumption can be achieved since the polysilicon thin film can be formed to have high resistance. In addition, when the polysilicon thin film 7 is used for the strain sensor 3, the strain measurement sensitivity can be increased about ten times than that in the case of using a metal thin film.

On the other hand, when a metal thin film is used for the strain sensor 3, the amount of change of resistance at the time of temperature change is relatively small, and thus the strain measurement can be made with high precision over a wide range of temperatures.

In this embodiment, the metal thin film or polysilicon thin film is formed on the silicon substrate 2 and patterned in thin lines by photolithography, and in that case the strain sensor 3 can be produced with the precision according to the present semiconductor-device manufacturing process. Therefore, in order to measure the strain of a small-sized object, the strain sensor 3 can be produced in a very small size with its reliability and precision kept high. Accordingly, the strain of a very small object can be measured with high precision.

In addition, since the semiconductor manufacturing process is used for the mechanical-quantity measuring device, this device can be produced at low cost and supplied in large quantity like the semiconductor device.

When a strain is measured, it is necessary to measure the amount of a strain component in a particular desired direction. When a thin film resistor is strained to change its resistance value, the amount of change of resistance produced from the thin film resistor is proportional to the integrating average of the amounts of strain caused within the resistor. Therefore, the length of the thin film resistor in the direction in which high sensitivity to strain is desired is made long relative to the thickness of the thin film resistor, but the lengths of the thin film resistor in the directions in which high sensitivity to strain is not desired is made short relative to the desired-direction length of the resistor in the measuring direction. Under this condition, it is possible to provide a high sensitivity substantially only in one direction. From the analysis by the inventors, it was revealed that, when the length of a thin film resistor formed on a silicon substrate was made more than fifty times as long as the thickness, the amount of strain substantially equal to that in the above silicon substrate could be uniformly caused within the thin film resistor. Therefore, in order to improve the strain measurement precision, it is necessary that the longitudinal length of the resistor be set more than 50 times as long as the thickness of the resistor, thereby increasing the sensitivity to strain in the longitudinal direction. In addition, the short-side length, or width of the resistor is determined less than 10 times as short as the thickness of the resistor. Thus, the integrating average of the amounts of short-side strain within the resistor can be decreased to less than a half of that caused in the silicon substrate. In other words, preferably, the length of the resistor in the direction in which high sensitivity to strain is necessary is increased more than 50 times as long as the thickness of the resistor, but the other lengths of the resistor in the directions in which high sensitivity to strain is not desired are decreased less than 10 times as short as the thickness of the resistor.

Moreover, while the silicon substrate 2 is used in this embodiment, the same effect can be achieved with other semiconductor substrates provided that they have linear expansion coefficients substantially equal to that of the metal thin film or polysilicon contrary to polyimide. If the mechanical-quantity measuring device 1 is built on a semiconductor substrate of silicon or the like, electronic circuits can also be built within the substrate by using the semiconductor manufacturing process. In this case, it is not necessary to supply the output from the strain sensor 3 through the pads 4 to the outside of the mechanical-quantity measuring device 1. Since the semiconductor substrate can have amplification circuits, analog-digital converters, rectifying/detecting circuits and antenna circuits built in, the output from the strain sensor 3 can be amplified or converted to a digital form, and then supplied to the outside of the mechanical-quantity measuring device or supplied to the outside by a wireless system. In this case, since the output from the strain sensor 3 can be amplified and converted to a digital form within the mechanical-quantity measuring device 1, the output from the device 1 can be supplied to the outside with the external noise effect on the output data being minimized, and thus the strain can be measured with high accuracy. In addition, when the output from the strain sensor 3 is transmitted to the outside by radio, the mechanical-quantity measuring device 1 does not need the exposed conductor terminals such as pads 4 for the connection to the outside. Thus, the device 1 can have high reliability since there is no corrosion of such pads.

In addition, when the silicon substrate 2 is attached to the measured object 11 to measure the strain, the sides of the silicon substrate 2 serve as free surfaces, and thus have a week constraint to the direction parallel to the interface between the silicon substrate 2 and the measured object 11. In other words, the peripheral region of the silicon substrate 2 has poor response to the strain of the measured object. In order to solve this problem, the silicon substrate 2 is formed thin to reduce its rigidity, and the strain sensor 3 is located in an area of the silicon substrate 2 other than the peripheral region of the silicon substrate 2. The inventors analyzed this problem by finite element method. From this analysis, it was understood that, when the ratio of the thickness of silicon substrate 2 to the width is selected to be 1/10 or less, the central region of the silicon substrate 2 can receive more than about half the strain of the measured object 11. The distribution of strain in the surface plane of the silicon substrate 2 is such that the strain conducted to the substrate surface is drastically decreased in the region ranging up to less than 1/5 of the substrate width away from the side edges of silicon substrate 2 as measured toward the center of the substrate. In other words, in order to measure the strain with high precision, the ratio of the thickness t of silicon substrate 2 to the width w, t/w is set to be preferably less than 1/10 as shown in FIG. 4. In addition, it is also desired that the strain sensor 3 be located within a sensor location area 301 with its sides respectively separated more than w/5 from the edges of the substrate on the surface of silicon substrate 2.

According to this embodiment, it is possible to reduce the generation of thermal stress in the interface between the thin film and the substrate that has posed a problem in the conventional metal foil strain gauge or semiconductor strain gauge, and to improve the reliability of the strain measurement.

Embodiment 2

Figure 5:
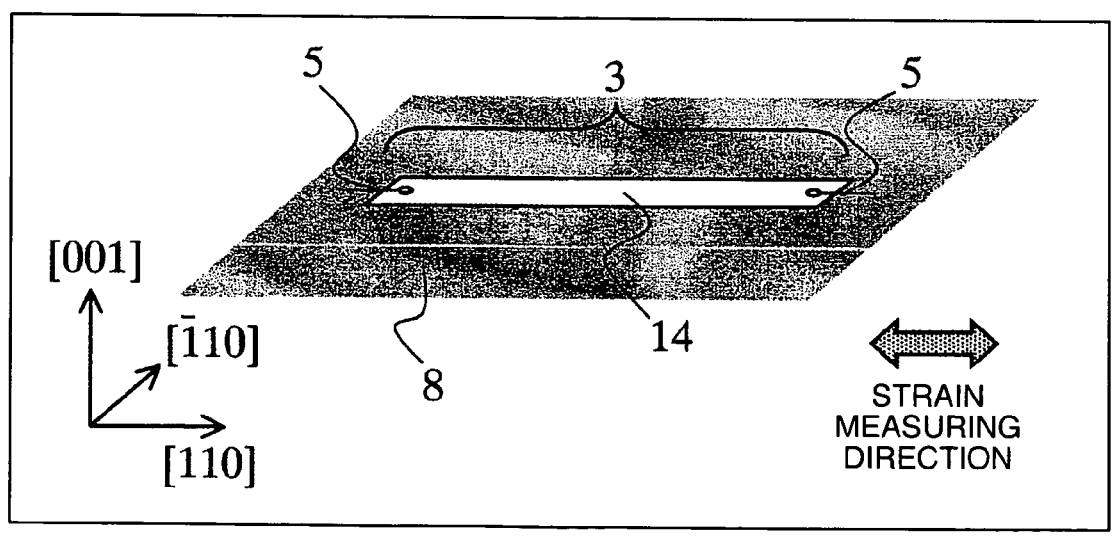
FIG. 5 is a diagram showing the strain sensor of the mechanical-quantity measuring device of the second embodiment according to the invention.

The second embodiment of the invention will be described with reference to FIG. 5. FIG. 5 shows a mechanical-quantity measuring device of the second embodiment according to the invention. This embodiment has the same structure as the first embodiment, but it is formed of a silicon single crystal substrate 8 as the substrate. On the surface of this single crystal silicon substrate 8 is formed the strain sensor 3 of an n-type impurity diffused layer 14.

The strain sensor 3 converts the strain into a quantity of electricity, which is then measured. In many cases, the strain sensor 3 is made of a polycrystalline material. However, when a strain is caused in the polycrystalline material, stress migration and intergranular corrosion are caused, thus greatly reducing the strength of the strain sensor elements. To solve this problem, the strain sensor elements are made of a single crystalline material that has no grain boundaries. In this embodiment, the strain sensor 3 of the mechanical-quantity measuring device 1 has an n-type impurity-diffused layer formed by diffusing impurity atoms into the single crystal silicon substrate 8. The amount of strain can be obtained by measuring the resistance change of the layer. Since the impurity-diffused layer formed in the single crystalline silicon substrate 8 is a single crystal, the strength is not reduced due to the grain boundary corrosion. In addition, since it is not a thin film deposited on the substrate, it is never peeled off from the substrate. When the impurity-diffused layer formed within the semiconductor single crystal is used to measure the resistance proportional to the change of strain, the change of the resistance of the impurity-diffused layer is affected by strain components of an unspecified number of directions irrespective of its shape. Therefore, when the mechanical-quantity measuring device 1 is installed on the measured object that is strained in multiaxial directions, it cannot precisely measure the amount of strain in a particular direction. In the following embodiments including this embodiment, an impurity-diffused resistance, or resistor will be used together with the impurity-diffused layer. In other words, unless otherwise stated, the impurity-diffused layer is treated as the equivalent to the impurity-diffused resistor or resistance in this embodiment.

FIG. 5 shows the mechanical-quantity measuring device 1 that solved this problem. In this embodiment, use of single crystalline silicon substrate 8 enables the device 1 to be prevented from the intergranular corrosion and to improve the reliability. However, it is necessary to consider the strong crystal orientation-dependency as a phenomenon unique to the single crystal and to make full use of it. This embodiment of the invention obtained a desired characteristic by considering the relation between the direction in which the change of the impurity-diffused resistance due to the current flow therein is measured and the crystal orientation of the silicon single crystal. As described below, Miller indices are used to specify the crystal face and crystal orientation in the single crystalline silicon substrate 8. Although minus direction is designated by a bar attached on the number in the notation using Miller indices, a minus sign "−" before the number is substituted for the number with a bar attached thereon, for example, as [−110] for the convenience of explanation in this specification. In addition, parentheses ( ) and square brackets [ ] are used for particular faces or directions, and curly braces { } and angular brackets < > for the equivalent faces and directions within the single crystalline silicon substrate. In addition, as described in this specification, current is caused to flow in the impurity-diffused layer in its longitudinal direction, and the change of the resistance is measured in the flowing direction. The longitudinal direction of the resistance indicates the direction in which the resistance change is measured when current is caused to flow in the resistance. The effect in this invention is obtained from the association of the crystal orientation of the single crystal substrate with the direction in which the change of the resistance of the impurity-diffused layer formed on the substrate is measured when current is caused to flow in the resistance. Particularly, the same effect can be obtained even when the longitudinal direction of the impurity-diffused layer is not coincident with the direction of the current flow.

In this embodiment, the mechanical-quantity measuring device 1 has the n-type impurity-diffused layer 14 formed by diffusing impurity atoms into the top, or {001} face of the single crystalline silicon substrate 8 and of which the longitudinal direction is parallel to the direction <110> of the silicon crystal as shown in FIG. 5.

The strained semiconductor changes its resistance value due to the piezoresistance effect. The piezoresistance effect of the semiconductor single crystal has an orthotropic anisotropy depending on its crystal structure. The resistance value changes in association with the relation of the direction in which the change of the current-flowing resistance is measured and the crystal orientation of the semiconductor single crystal. When the n-type impurity-diffused layer 14 is formed by diffusing impurity atoms into the {001} face of single crystalline silicon substrate 8 so that its longitudinal direction is parallel to the <110> direction of single crystalline silicon substrate 8, the n-type impurity-diffused layer 14 can have a great sensitivity to the normal strain in the longitudinal direction of the resistance, but reduce the sensitivity to the strain components in the other directions within the top of single crystalline silicon substrate 8. If the mechanical-quantity measuring device having the n-type impurity-diffused layer 14 is installed on the measured object in such a manner that the direction in which the strain is measured can be aligned in parallel to the longitudinal direction of the n-type impurity-diffused layer, the normal strain in that direction can be measured with high precision. Since the surface of the silicon wafer used in the semiconductor production usually is the {001} face of silicon crystal, the silicon wafer having the {001} face as its surface is used here as an example of silicon wafer. However, if the silicon wafer surface has a crystal orientation substantially equal to the {001} rather than the {110} face, the same effect can be achieved. While the longitudinal direction of n-type impurity-diffused layer 14 is aligned in parallel to the <110> direction of single crystalline silicon substrate 8 in this embodiment as described above, this alignment is ideal. If it is aligned in parallel to the direction substantially close to the direction <110> rather than the direction <100> of the silicon single crystalline substrate 8, the same effect can be obtained.

In addition, in order to measure the strain with higher sensitivity, the strain sensor 3 is located within the area separated more than ⅕ the substrate width toward the substrate center from the edges of the substrate on the surface of single crystalline silicon substrate 8 as in the first embodiment. Moreover, the single crystalline silicon substrate 8 may have electronic circuits such as amplification circuits, analog-digital converters, rectifying/detecting circuits and antenna circuits built thereon within the mechanical-quantity measuring device as well as the strain sensor 3.

According to this embodiment, it is possible to achieve the effect of removing the influence of the stress migration and intergranular corrosion on the strain sensor and of measuring with high reliability over a long period of time. In addition, when the strain is measured, it is possible to reduce the influence of the strain of which the direction is different from that of the strain measurement as a defect of the impurity-diffused layer of single crystalline semiconductor. Thus, the strain can be measured with high precision.

Embodiment 3

Figure 6:
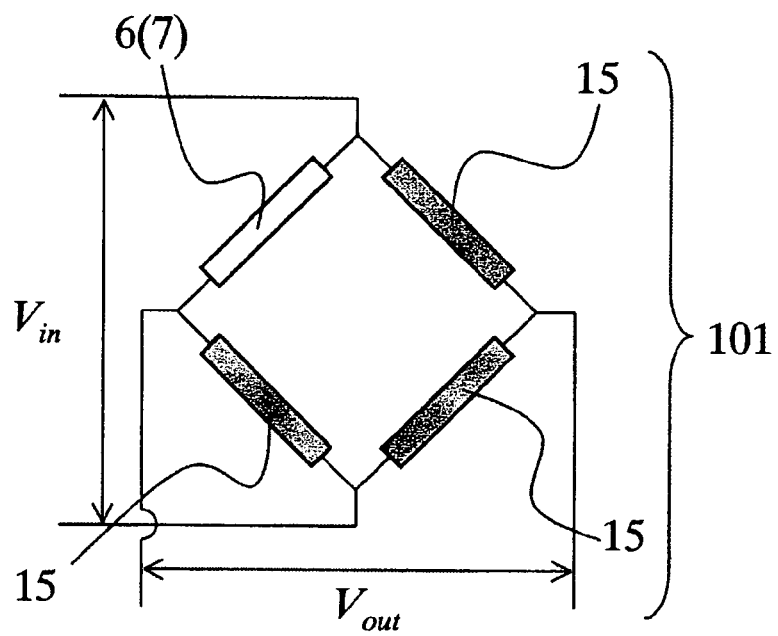
FIG. 6 is a diagram showing the strain sensor of the mechanical-quantity measuring device of the third embodiment according to the invention.

The third embodiment of the invention will be described with reference to FIGS. 6 through 11. FIG. 6 shows an example of the strain sensor of the mechanical-quantity measuring device as the third embodiment of the invention. This embodiment has the same structure as the first embodiment. The strain sensor formed on the single crystalline silicon substrate 8 has a Wheatstone bridge circuit formed of a metal thin film or polysilicon thin film and p-type impurity-diffused layers.

It is known that the resistance change of a resistor made of a semiconductor material such as silicon is strongly affected by the temperature. If the strain sensor 3 is made of the above semiconductor material, the resistance value changes due to the temperature change even when it is not strained. Since the resistance change due to the piezoresistance effect of the semiconductor is very small, the amplification circuits of the following stage are normally used to amplify the resistance-change output. In this case, although the amplification circuits are designed so that the output center-value or output reference-value of the sensor can be confined within the amplification range, the change of the output reference-value of strain sensor 3 due to the temperature variation might exceed the limit of the amplification range of the amplification circuits even under the distortionless condition, disabling the device 1 to measure the amount of strain. In order to avoid this problem on the amplification circuit's side, it is necessary to design so that the variation of the output center-value of the strain sensor 3 due to temperature change can be confined within the limit of the amplification range of the amplification circuit. In this case, the gain of the amplification circuit cannot be increased, and the strain cannot be measured with high precision. In other words, it is necessary to provide a mechanism that does not cause the output center-value not to change even when the strain sensor 3 itself changes its resistance due to temperature change.

Figure 7:
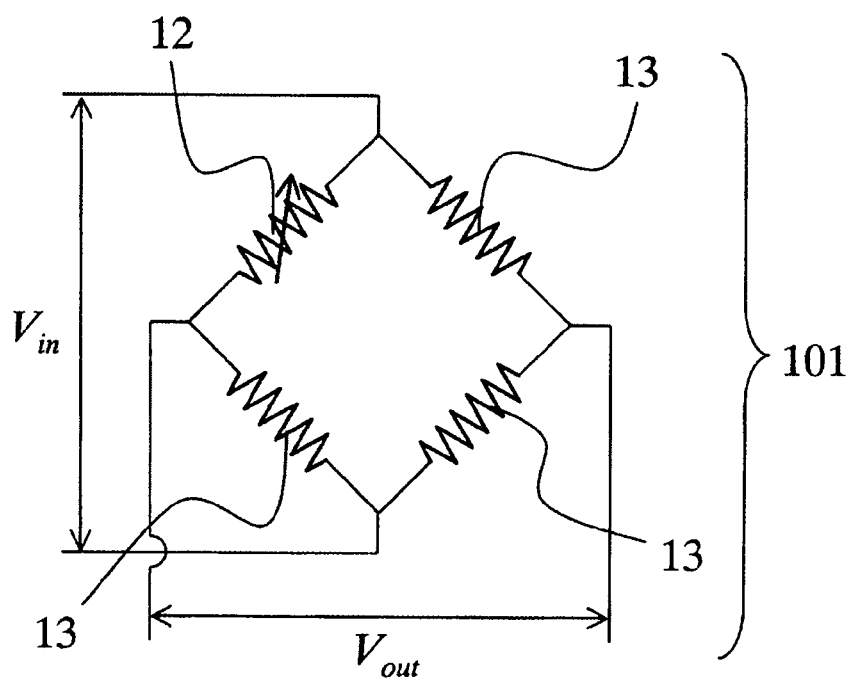
FIG. 7 is a schematic diagram showing the Wheatstone bridge circuit.

The metal foil strain gauge is generally used to constitute a Wheatstone bridge circuit 101 shown in FIG. 7 and to measure. The Wheatstone bridge circuit 101 is formed of four resistors each having an equal resistance value. Of these four resistors, one active resistor 12 has sensitivity to strain, and other three dummy resistors 13 have no sensitivity to strain. The four resistors of the Wheatstone bridge circuit are located under the same temperature environment, thus providing the effect for temperature compensation. Thus, the output center-point is not affected by the temperature variation. In practice, it is necessary that the metal foil strain gauge as the active resistor of the Wheatstone bridge circuit 101 be adhered to the measured object that is strained, and that the other resistors than the metal foil strain gauge be not adhered to the measured object as dummy resistors, but separated away from the active resistor so that they can be maintained under a strain-free condition. The mechanical-quantity measuring device 1 of this embodiment has the Wheatstone bridge within the single crystalline substrate 8. When the dummy resistors of the Wheatstone bridge circuit are located to separate from the active resistor, it is difficult to make the temperature condition of the active resistor equal to that of the dummy resistors.

However, when the active resistor and dummy resistors are formed on the same substrate, the resistors constituting the Wheatstone bridge circuit are located close to each other under the same environment. Thus, all the resistors can be placed under the same temperature condition. In addition, since the silicon of the substrate has good thermal conductivity, the temperature compensation effect of the bridge circuit can be enhanced. Moreover, since the wiring conductors for connecting the resistors within the bridge circuit can be shortened, it is possible to suppress the excessive resistance value from being varied due to the conductor length difference. In addition, since the bridge circuit can be formed within a very small area, it is possible to reduce the variation of the output center-value due to the external noise effect and light irradiation. However, a larger problem is posed when the Wheatstone bridge is tried to build by using thin film resistors and impurity-diffused resistors within the single crystalline silicon substrate 8.

The mechanical-quantity measuring device 1 according to the invention is attached to the measured object 11 with its adhesive side 10 down to the object surface. The strain caused in the measured object 11 is transmitted through the adhesive side 10 to the substrate. However, when the Wheatstone bridge is formed on the same substrate, the strain is acted on all the resistors constituting the bridge circuit. Thus, since the dummy resistors having no sensitivity to strain cannot be provided, the Wheatstone bridge circuit cannot normally operate.

Figure 8:
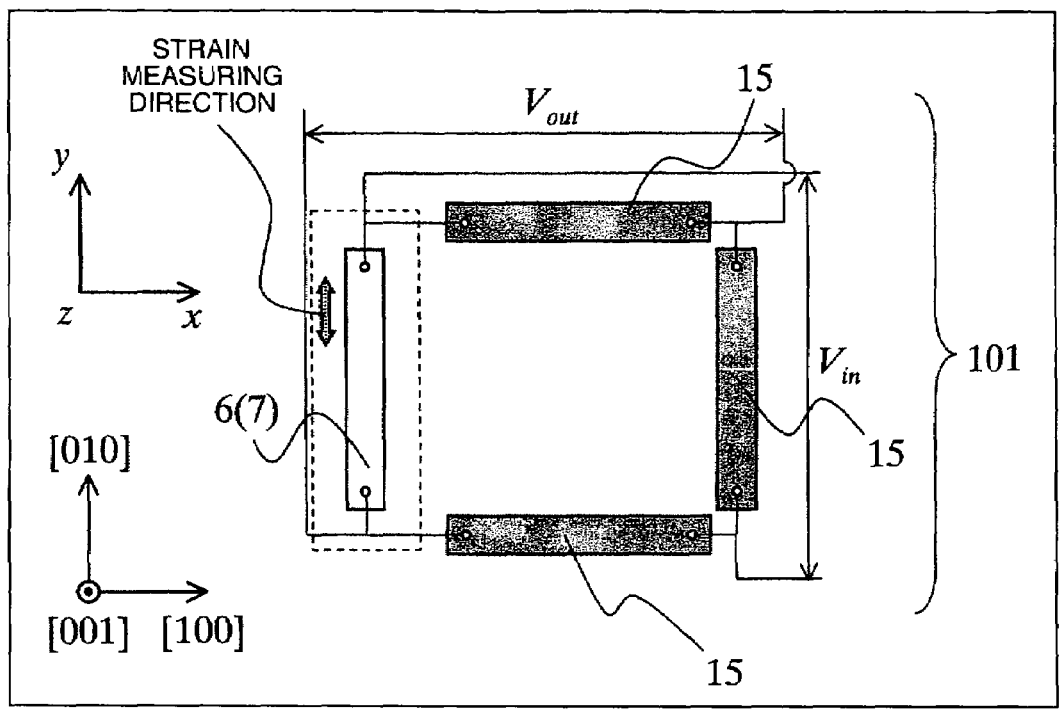
FIG. 8 is a diagram showing an example of the strain sensor of the mechanical-quantity measuring device of the third embodiment according to the invention.
Figure 9:
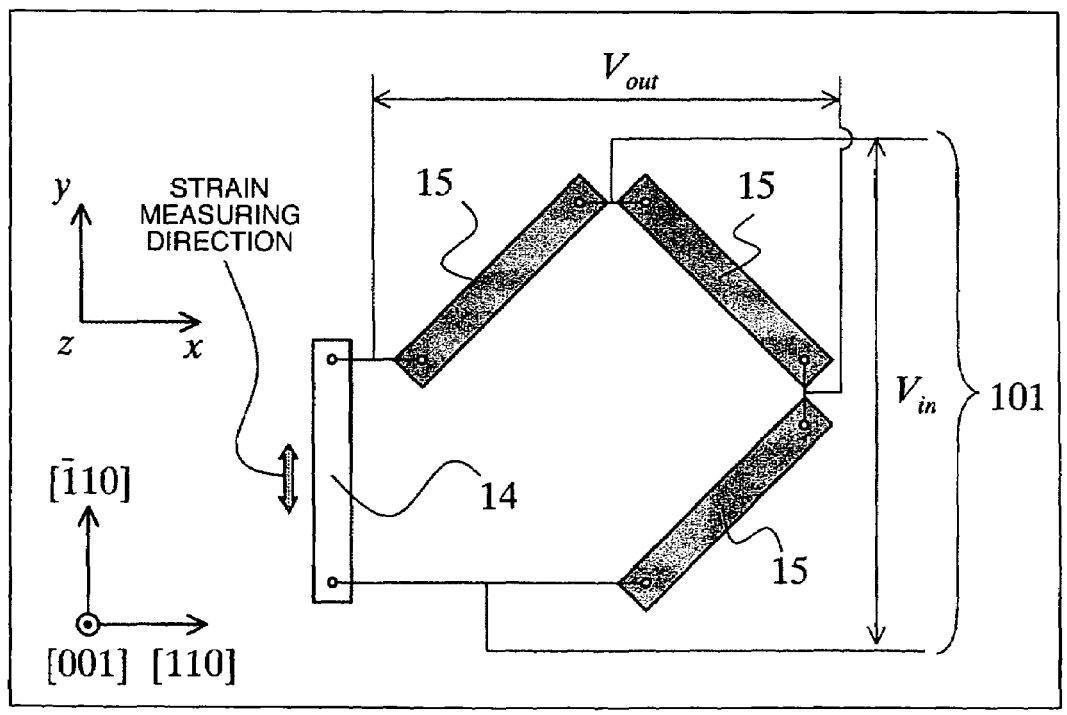
FIG. 9 is a diagram showing another example of the strain sensor of the mechanical-quantity measuring device of the third embodiment according to the invention.

FIGS. 8 and 9 show the strain sensor 3 that solved this problem in this embodiment. In this embodiment, the strain sensor shown in FIG. 6 exists on the single crystalline silicon substrate of the mechanical-quantity measuring device. This strain sensor has the Wheatstone bridge circuit of the structure shown in FIG. 8 or 9. The active resistor having sensitivity to strain in the Wheatstone bridge circuit shown in FIG. 8 is the metal thin film 6 or the polysilicon thin film 7. The active resistor is located so that its longitudinal direction can be aligned in parallel to the direction in which the strain is measured. As in the first embodiment, the length of the metal thin film 6 or polysilicon thin film 7 in the longitudinal direction in which the strain is measured is made more than 50 times the thickness of the film, and the width of the metal thin film 6 or polysilicon thin film 7 in the direction perpendicular to the strain-measuring direction is made less than 10 times the thickness of the thin film. Thus, the metal thin film 6 or polysilicon thin film 7 has sensitivity to only the normal strain component in the longitudinal direction. In the Wheatstone bridge circuit shown in FIG. 9, the active resistor having sensitivity to strain is the n-type impurity-diffused layer 14 formed by diffusing impurity atoms into the single crystalline silicon substrate so that its longitudinal direction can be aligned in parallel to the <110> direction of the silicon crystal. The dummy resistors constituting the Wheatstone bridge circuit 101 shown in FIGS. 8 and 9 are formed by using p-type impurity-diffused layers of which the longitudinal directions are aligned in parallel to the <100> direction of the silicon single crystal. The piezoresistance effect of the silicon single crystal has anisotropy depending on the crystal structure. The direction in which the resistance value of the p-type impurity-diffused layer is measured when current flows in the layer is aligned in parallel to the <100> direction of the single crystal silicon substrate. Thus, the resistance values of the p-type impurity-diffused layers are almost not affected by strain, and thus can be used as dummy resistors. The Wheatstone bridge circuit has equal-value resistors formed of the p-type impurity-diffused layers as dummy resistors and the polysilicon thin film or metal thin film or n-type impurity-diffused layer as the active resistor. Thus, this Wheatstone bridge circuit can operate on the same substrate. In addition, the metal thin film 6 is subjected to alloying to change the metal concentration. The polysilicon thin film 7 or n-type impurity-diffused layer 14 is changed in its diffused-impurity concentration. Thus, the rate of change of resistance to temperature in this active resistor can be made equal to those of the p-type impurity-diffused layers 15 as the dummy resistors. Therefore, it is possible to increase the temperature compensation effect of the Wheatstone bridge circuit of this structure.

In the Wheatstone bridge circuit of this embodiment shown as an example in FIG. 8, since the metal thin film 6 or polysilicon thin film 7 as the active resistor has sensitivity to strain chiefly in its longitudinal direction, its longitudinal direction may have any orientation on the single crystalline silicon substrate 8. In addition, while the longitudinal direction of the p-type impurity-diffused layers 15 in this embodiment is aligned in parallel to the <100> direction of the single crystalline silicon substrate 8 as described above, this alignment condition is ideal. The same effect can be achieved if it is aligned in parallel to substantially the <100> direction rather than the <110> direction of the single crystalline silicon substrate 8.

Figure 10:
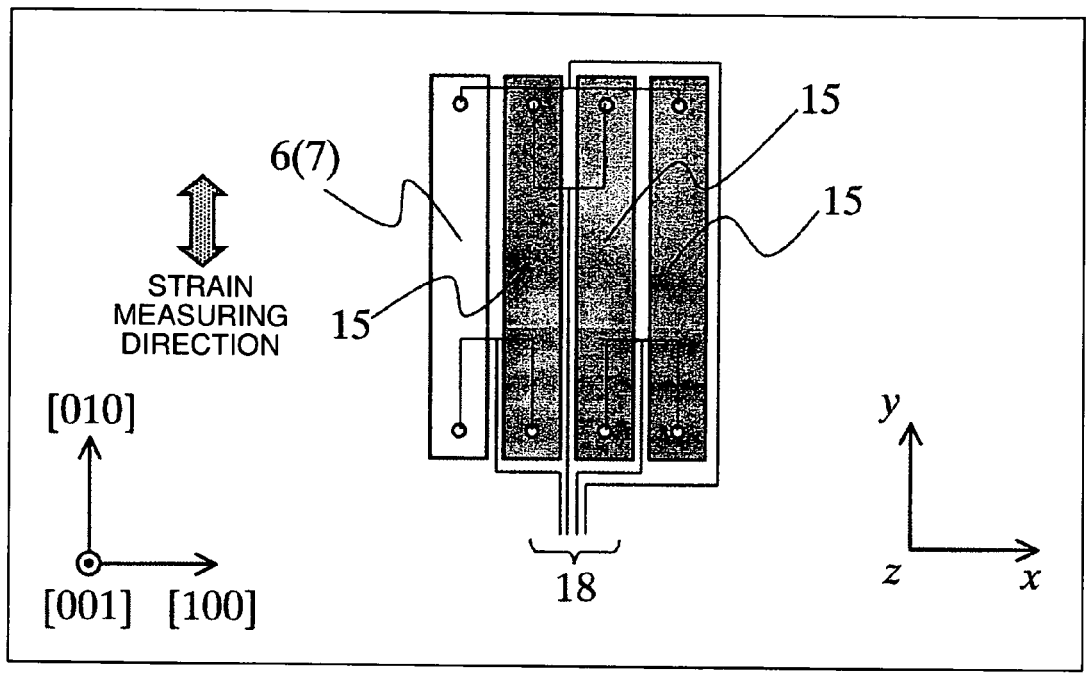
FIG. 10 is a diagram showing an example of the location and wiring method of the strain sensor of the mechanical-quantity measuring device of the third embodiment according to the invention.
Figure 11:
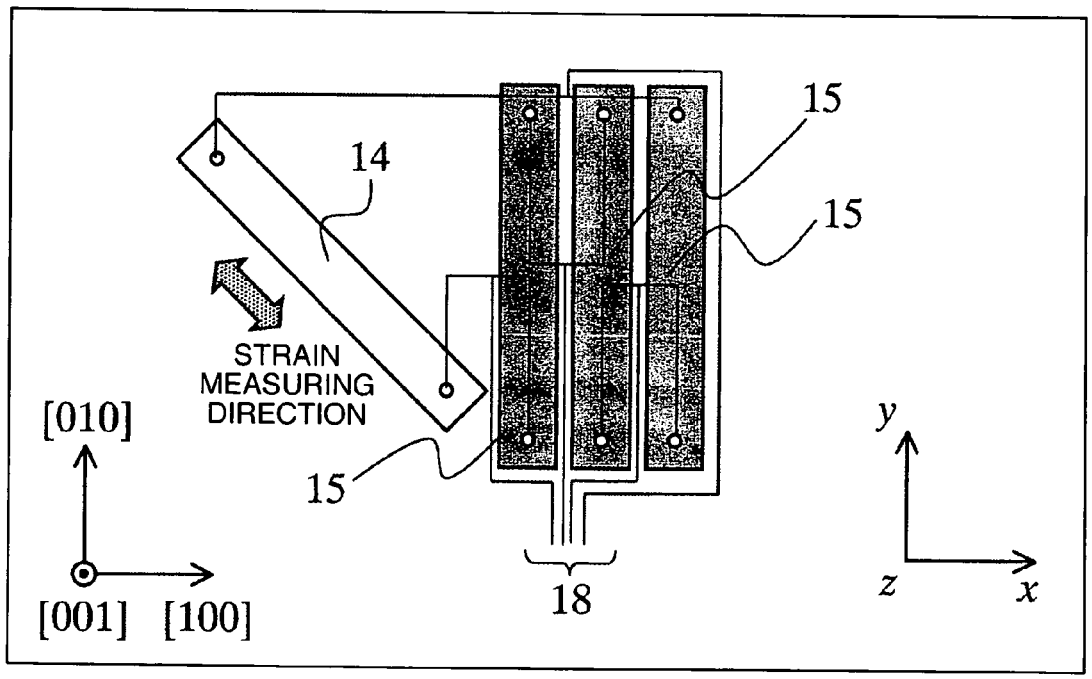
FIG. 11 is a diagram showing another example of the location and wiring method of the strain sensor of the mechanical-quantity measuring device of the third embodiment according to the invention.

FIGS. 10 and 11 show examples of the arrangement of resistors and wiring method in the strain sensor 3 according to this embodiment. The arrangement of resistors shown in FIGS. 8 and 9 is such that two ones of the three dummy resistors are parallel to each other and the remaining one is perpendicular to the two dummy resistors. When the p-type impurity-diffused layers are used as the dummy resistors, their longitudinal directions must simply coincide with the <100> direction. Thus, the dummy resistors may be all aligned in parallel as shown in FIGS. 10 and 11. In this case, the area occupied by the dummy resistors can be minimized. Thus, since the resistors are placed close to each other, the temperature compensation effect can be increased. In addition, since the metal thin film 6 or polysilicon thin film 7 as the active resistor in FIG. 10 is not affected by the crystal orientation of the single crystalline silicon substrate 8, it may be placed in parallel to the dummy resistors as shown in FIG. 10. In this case, the area occupied by the whole Wheatstone bridge circuit can be minimized. Since the distances between the resistors are short, the temperature compensation effect can be heightened. In this case, the strain-measuring direction is y-direction on the xyz coordinates shown in FIG. 8. In addition, as illustrated in FIG. 10, the lengths of the wiring conductors connecting the four resistors are made equal, and conductors are lead out from the mid point of the conductors connecting the resistors to the outside. Thus, the resistances of the wiring conductors do not affect the output offset of the Wheatstone bridge circuit. Moreover, the Wheatstone bridge circuit of this embodiment is one-active type in which one of the four resistors is selected as the active resistor sensitive to strain, and the remaining three resistors as the dummy resistors. In this case, the same effect can also be achieved by constructing the Wheatstone bridge as the two-active type in which two resistors are selected as active resistors and the remaining two resistors as the dummy resistors or the three-active type in which three resistors are selected as active resistors and the remaining one as a dummy resistor.

In addition, as in the first embodiment, the strain sensor 3 for measuring strain with higher sensitivity can be formed within the area separated more than ⅕ the width of the substrate toward the substrate center from the edges of the substrate on the surface of the single crystalline silicon substrate 8. Moreover, other electronic circuits such as amplification circuits, analog-digital converters, rectifying/detecting circuits and antenna circuits may be built in as well as the strain sensor 3 is formed within the mechanical-quantity measuring device on the single crystalline silicon substrate 8.

Embodiment 4

Figure 12:
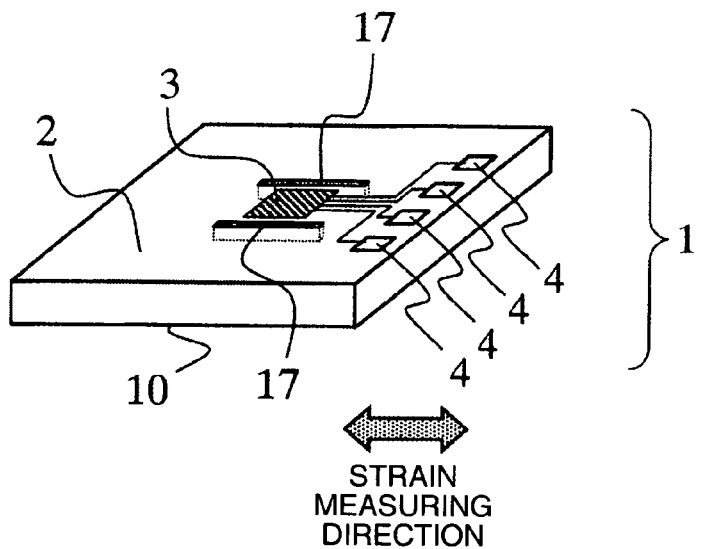
FIG. 12 is a diagram showing the mechanical-quantity measuring device of the fourth embodiment according to the invention.

The fourth embodiment of the invention will be described with reference to FIGS. 12 through 22. FIG. 12 shows an example of the mechanical-quantity measuring device of the fourth embodiment according to the invention. This embodiment has the same structure as the first embodiment. On the silicon substrate 2 within the mechanical-quantity measuring device 1, are constructed the strain sensor 3 having a Wheatstone bridge circuit, and slits 17 on the sides of the strain sensor 3. As in the third embodiment, when the Wheatstone bridge circuit is formed on the same substrate, all the resistors constituting the Wheatstone bridge circuit are affected by strain, and thus the active resistor cannot be definitely distinguished from the dummy resistors. Thus, the Wheatstone bridge circuit does not normally operate.

Figure 13A:
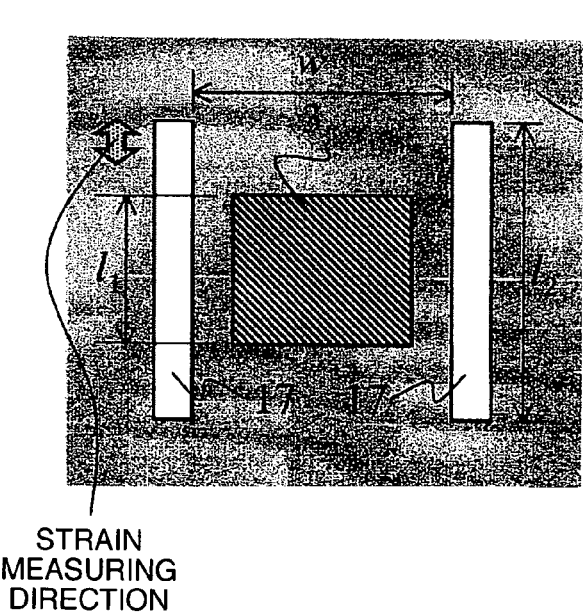
FIGS. 13A and 13B are diagrams showing the structure of the strain sensor of the mechanical-quantity measuring device of the fourth embodiment according to the invention.
Figure 13B:
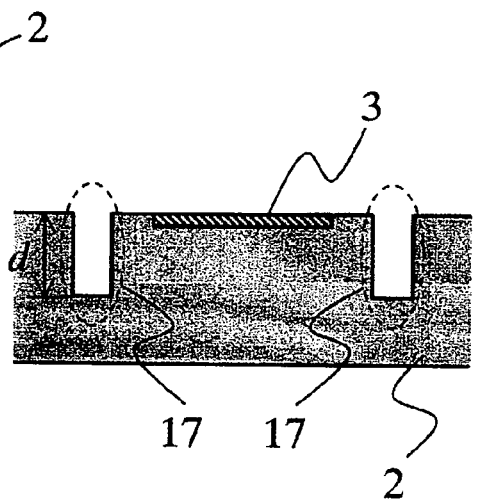

FIG. 12 shows the mechanical-quantity measuring device 1 that solved this problem in this embodiment. In this embodiment, the strain sensor 3 having the Wheatstone bridge circuit formed is located on the silicon substrate 2 of the mechanical-quantity measuring device 1 as shown in FIG. 12. The feature of this embodiment is to have the slits 17 on the sides of the strain sensor 3. As we described about the first embodiment, in the mechanical-quantity measuring device having the adhesive side 10 opposite to the plane in which the strain sensor exists, the strain distribution on the top of the silicon substrate on which the strain sensor 3 is formed is dependent on the thickness and length of the substrate of the device 1. The inventors analyzed this distribution. From this analysis, it will be understood that, when the length of the substrate is less than 10 times the thickness of the substrate, the integral average of the strain on the top of the substrate is less than half the strain caused on the measured object. Thus, the slits 17 are provided on the sides of the strain sensor 3 on the silicon substrate 2 as shown in FIGS. 13A and 13B. The longitudinal direction of the slits 17 is aligned in parallel to the direction in which strain is measured. The slits 17 are formed on the sides of the strain sensor 3, or formed in the direction perpendicular to the direction in which strain is measured. Thus, the strain components in the direction in which strain is measured are determined by the relation between the thickness of the silicon substrate 2 and the length of the substrate 2 along which strain is measured. The sensitivity to strain components in the direction perpendicular to the strain measuring direction is determined by the depth d of the slits 17 provided on both sides of the strain sensor 3 and the distance w between the slits. If the slit distance w is less than 10 times the depth d of the slits, the sensitivity in the directions in which strain is not measured can be reduced to less than half. Therefore, when the mechanical-quantity measuring device 1 is produced to have a preferential sensitivity in one-axis direction, the depth d of the slits provided on both sides of the strain sensor 3 is selected to be preferably more than ¹⁄₁₀ the slit distance w. In addition, the longitudinal length $l_2$ of the slits 17 is preferably made longer than the length $l_1$ of the strain sensor 3 in the strain measuring direction. Therefore, the effect of the slits can be given to the whole strain sensor 3, strengthening the directivity of the sensitivity to strain in the strain sensor 3. Thus, the strain in the strain measuring direction can be detected with high precision.

In addition, although the longitudinal direction of the slits 17 is aligned in parallel to the strain-measuring direction in order to minimize the area occupied by the strain sensor 3 and slits 17 as described in this specification and shown in the drawings, the same effect can also be achieved by forming the slits of which the longitudinal direction is substantially perpendicular to the strain-measuring direction.

Figure 14:
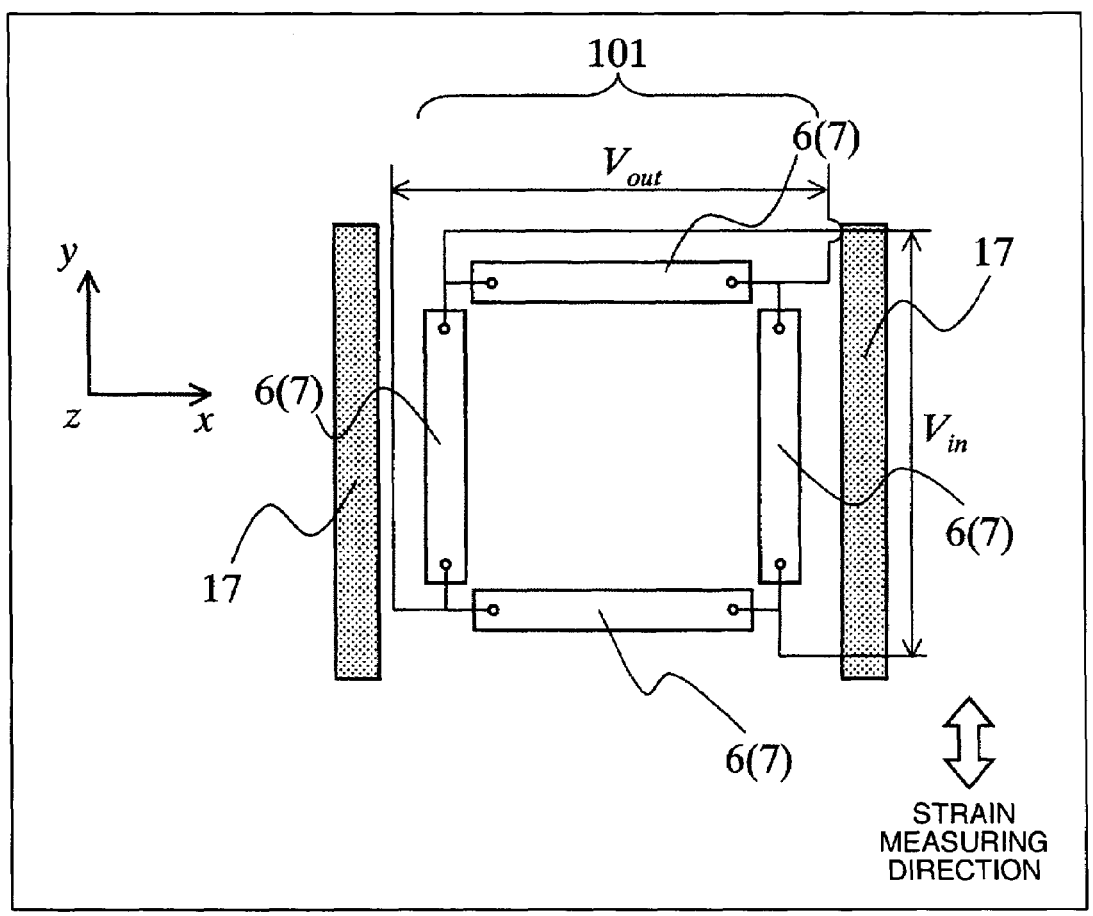
FIG. 14 is a diagram showing the details of an example of the strain sensor of the mechanical-quantity measuring device of the fourth embodiment according to the invention.

When two slits are provided on the substrate, the amount of normal strain between the slits, or in the direction connecting the slits becomes little by the effect of the slits. As shown in FIG. 14, the Wheatstone bridge circuit formed of the metal thin film 6 or polysilicon thin film 7 is located between the slits 17 on the substrate, and the longitudinal direction of at least one of the metal thin film or polysilicon thin film is matched to the slits-connecting direction. In addition, the longitudinal direction of the other metal thin film or polysilicon thin film is made in parallel to the direction perpendicular to the slits-connecting direction. In this case, the metal thin film or polysilicon thin film of which the longitudinal direction is coincident with the slits-connecting direction has very week sensitivity to strain due to the effect of the slits and the effect of the shape of the thin film itself. On the other hand, the metal thin film or polysilicon thin film of which the longitudinal direction is perpendicular to the slits-connecting direction on the substrate surface has only the sensitivity to normal strain in the longitudinal direction of the thin film. In other words, when the bridge circuit is constructed by using the thin film formed in parallel to the straight line connecting the slits and the thin film formed perpendicular thereto on the substrate surface, the bridge circuit has the sensitivity to only the normal strain component in the direction perpendicular to the straight line connecting the slits. If the strain measuring direction is matched to the direction perpendicular to the straight line connecting the slits, the normal strain in a particular direction can be measured with high precision.

Although the strain sensor desirably has a Wheatstone bridge circuit provided by forming impurity-diffused layers on the single crystalline semiconductor in order to measure a strong and highly reliable strain as described above, the strain sensor 3 using the impurity-diffused layers of the single crystalline semiconductor is affected by the multidirectional strain as in the second embodiment. When the strain sensor 3 has the Wheatstone bridge formed of impurity-diffused resistors on the single crystalline silicon substrate substituted for the silicon substrate 2 shown in FIG. 11 and has the slits 17 provided on both sides, it is possible to reduce the sensitivity to the normal strain in the direction in which the slits 17 oppose to each other, but the strain sensor 3 is slightly affected by the shearing strain caused on the surface of the single crystalline silicon substrate on which the strain sensor 3 is formed. Therefore, the strain sensor 3 is preferably constructed to have no sensitivity to the shearing strain.

Thus, a method of locating the impurity-diffused layers on the single crystalline silicon substrate in order to solve this problem will be described with reference to FIGS. 15 through 22.

Figure 15:
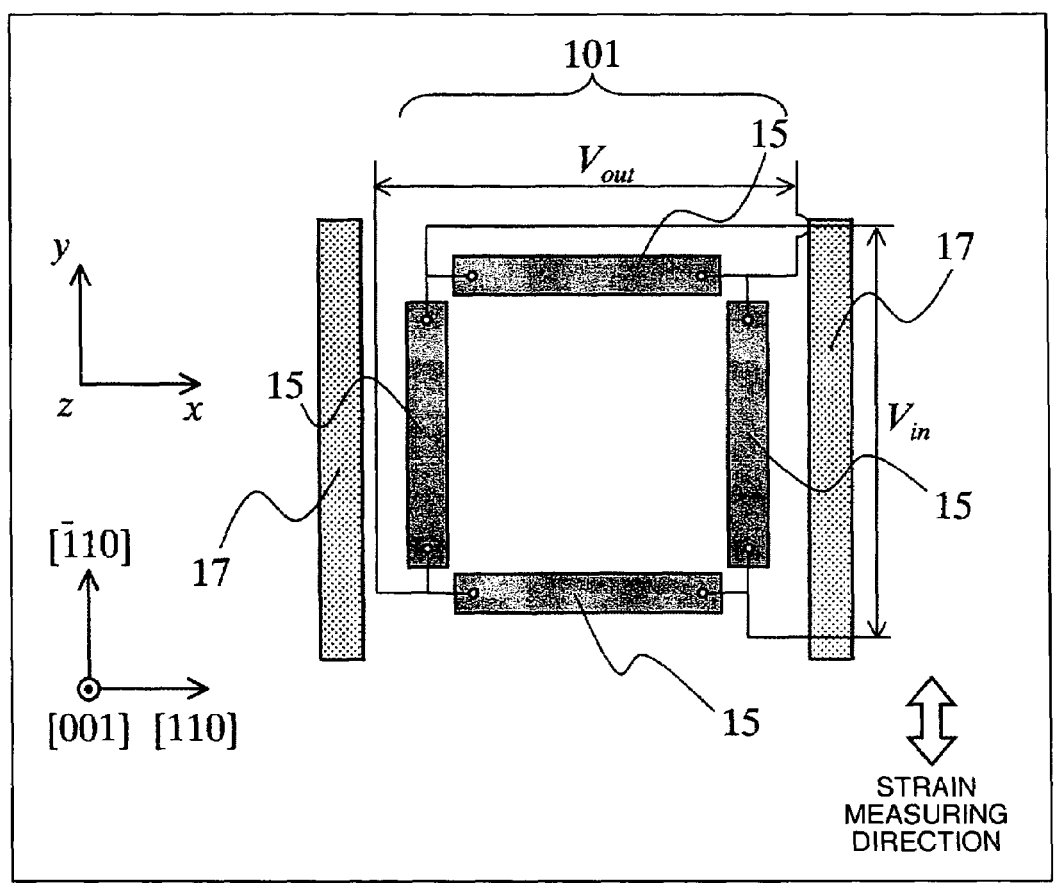
FIG. 15 is a diagram showing the details of another example of the strain sensor of the mechanical-quantity measuring device of the fourth embodiment according to the invention.

The piezoresistance effect of the silicon single crystal has anisotropy as described above. As shown in FIG. 15, the <110> direction of the single crystalline silicon substrate is made coincident with the xy coordinates as the reference of the strain measurement, and the longitudinal direction of the p-type impurity-diffused layer is aligned in parallel to the <110> direction of the single crystalline silicon substrate. When current is caused to flow in the p-type impurity-diffused layer in its longitudinal direction, the resistance change is measured. In this case, the resistance change of the p-type impurity-diffused layer is not affected by the shearing strain component $\gamma_{xy}$ caused on the xy plane. The Wheatstone bridge circuit 101 has the sensitivity to only the normal strain components $\epsilon_x$ and $\epsilon_y$ in the direction parallel to the x-axis and y-axis. When the slits 17 are provided on both sides of the Wheatstone bridge circuit 101 in the x-axis direction, the sensitivity to the normal strain in the x-axis direction of strain sensor 3 is reduced by the slits 17, and thus the strain sensor 3 can have the sensitivity to only the normal strain component $\epsilon_y$ in the y-axis direction. Therefore, it is possible to provide a mechanical-quantity measuring device having the sensitivity to only the normal strain component in a single desired train-measuring direction.

Figure 16:
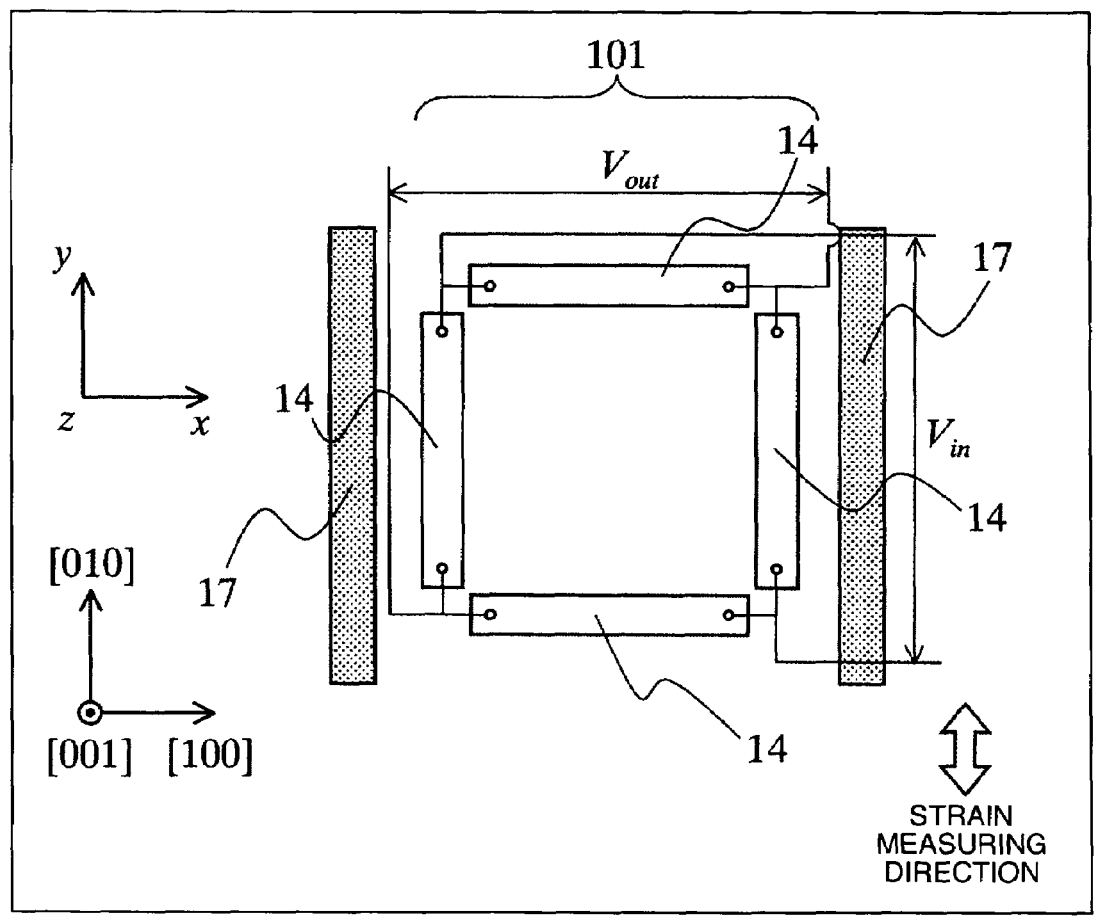
FIG. 16 is a diagram showing the details of another example of the strain sensor of the mechanical-quantity measuring device of the fourth embodiment according to the invention.

FIG. 16 shows an example of the arrangement of resistors of the Wheatstone bridge circuit 101 formed by n-type impurity-diffused layers. The Wheatstone bridge circuit 101 is formed of the n-type impurity-diffused layers of which the longitudinal direction is parallel to the <100> direction of the single crystalline silicon substrate. In this case, too, when the <100> direction of the single crystalline silicon substrate is matched to the xy coordinates as the reference of the strain measurement, the resistance change of the n-type impurity-diffused layers is not affected by the shearing strain component $\gamma_{xy}$ on the xy plane. The Wheatstone bridge circuit 101 has the sensitivity to only the normal strain components $\epsilon_x$ and $\epsilon_y$ in the direction parallel to the x-axis and y-axis. When the n-type impurity-diffused layers are used, the n-type impurity-diffused layers exhibit a larger resistance change with the change of temperature than the p-type impurity-diffused layer. Thus, when the resistance values of the resistors scatter at the time of producing the bridge, the temperature compensation function is somewhat reduced, but the sensitivity to strain is higher than that of the p-type impurity-diffused layer. Even when the n-type impurity-diffused layers are used, the strain sensor 3 having the Wheatstone bridge circuit 101 can have the sensitivity to only the normal strain in a desired particular direction if the slits 17 are provided on both sides of the Wheatstone bridge 101 in the x-axis direction.

Figure 17:
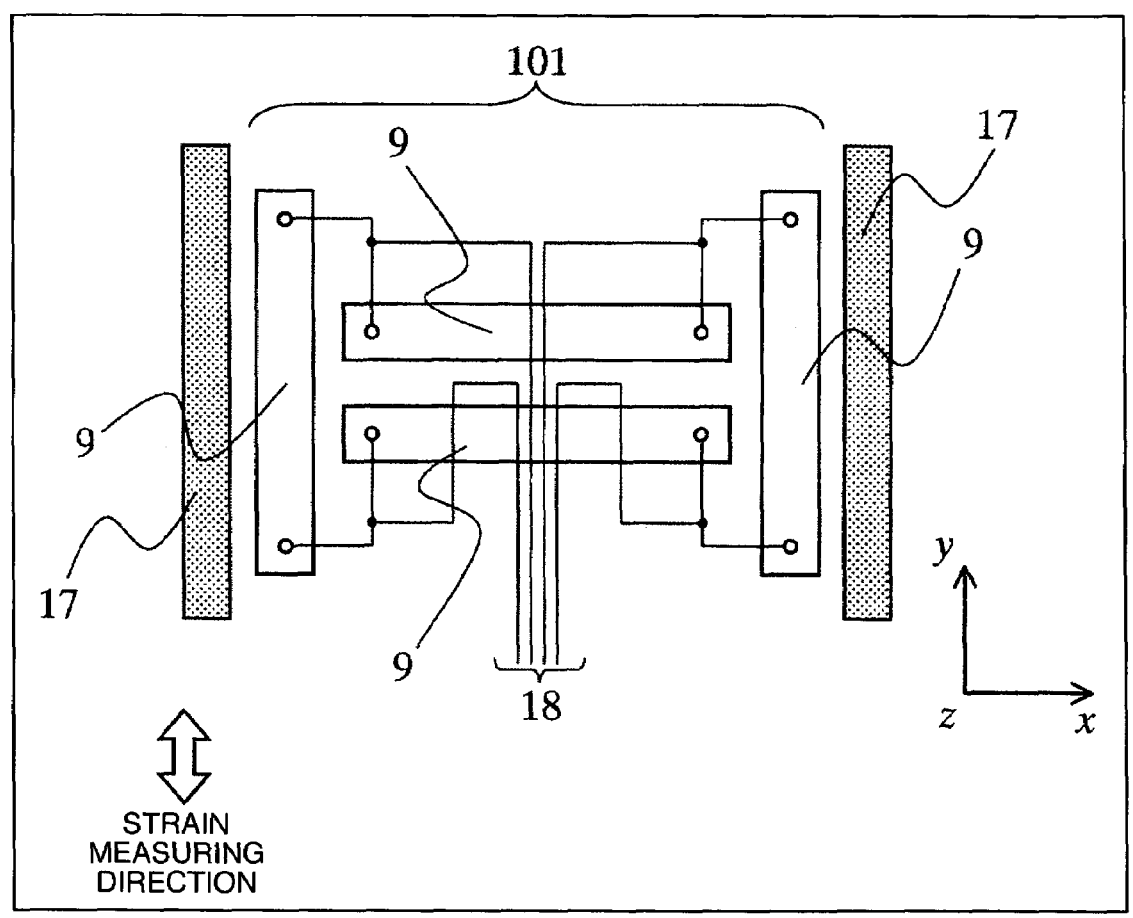
FIG. 17 is a diagram showing an example of the location and wiring method of the strain sensor of the mechanical-quantity measuring device of the fourth embodiment according to the invention.

FIG. 17 shows an example of the arrangement of resistors and the wiring conductors between the resistors in the Wheatstone bridge circuit shown in FIGS. 15 and 16. When the impurity-diffused resistors 9 are of the p-type impurity-diffused layers in FIG. 17, the resistors constituting the Wheatstone bridge circuit are arranged in parallel to the <110> direction of the single crystalline silicon substrate. When the impurity-diffused resistors 9 are of the n-type impurity-diffused layers, the resistors constituting the bridge circuit are arranged in parallel to the <100> direction of the single crystalline silicon substrate. The Wheatstone bridge circuit shown in FIG. 17 is formed in order to occupy the minimum area and to make the lengths of the wiring conductors connecting the four resistors equal. In addition, lead conductors are lead out from the mid point of the wiring conductors connecting the resistors to the outside so that the resistance of the wiring conductors cannot be prevented from affecting the output offset of the Wheatstone bridge circuit.

Figure 18:
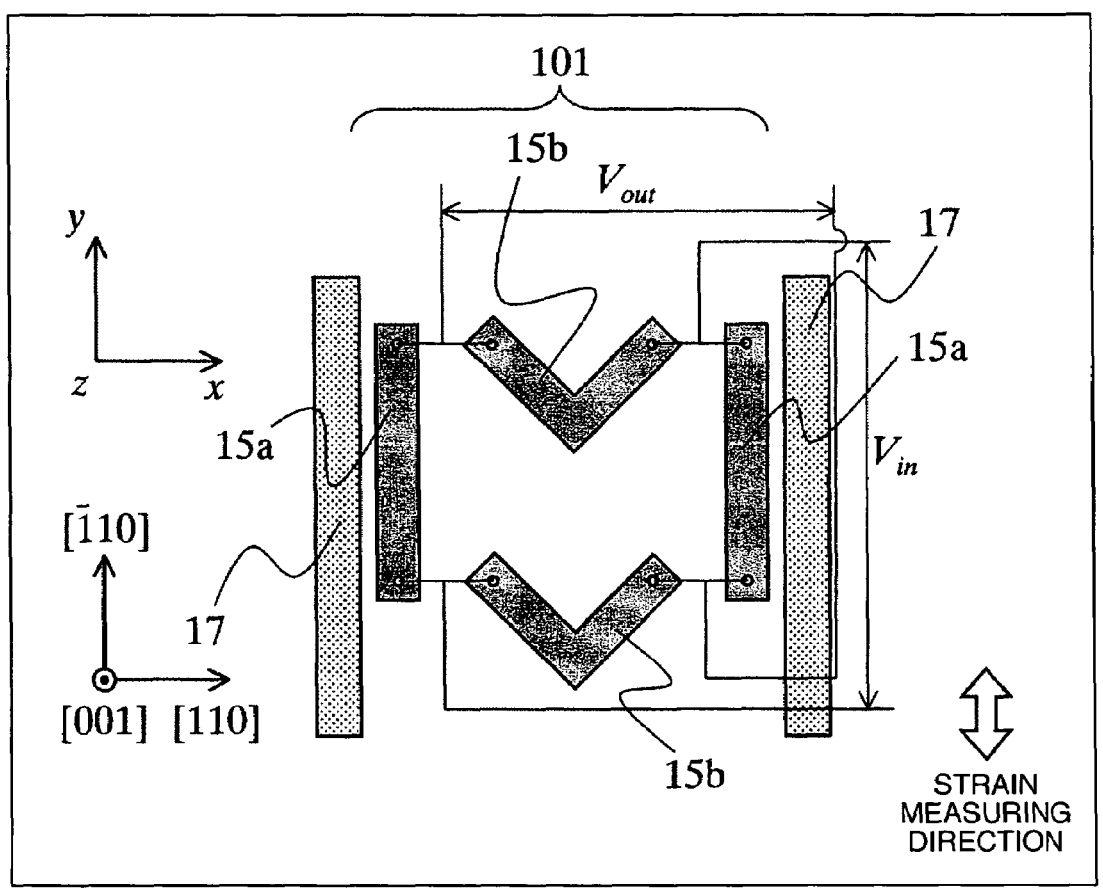
FIG. 18 is a diagram showing the details of another example of the strain sensor of the mechanical-quantity measuring device of the fourth embodiment according to the invention.

FIG. 18 shows a Wheatstone bridge circuit having p-type impurity-diffused layers 15a of which the longitudinal direction is parallel to the <110> direction of the single crystalline silicon substrate, and p-type impurity-diffused layers 15b of which the longitudinal direction is parallel to the <100> direction of the single crystalline silicon substrate and which are each bent by an angle of 90° at the mid point of half resistance. The p-type impurity-diffused layer 15b has its longitudinal direction aligned in parallel to the <100> direction of the single crystalline silicon substrate and is bent by an angle of 90° at the mid point of half resistance. Here, if the <110> direction of the single crystalline silicon substrate is matched to the xy axes, and if the p-type impurity-diffused layers are formed so that their longitudinal direction, or the direction in which the resistance change due to current flowing therein is measured can coincide with the <100> direction of the single crystalline silicon substrate, the p-type impurity-diffused layers hardly have the sensitivity to the normal strain components $\epsilon_x$ and $\epsilon_y$. In addition, when the p-type impurity-diffused layers are bent at the mid point by an angle of 90°, the half resistances on both sides of the mid point cancel out their resistance changes due to the shearing strain component $\gamma_{xy}$, so that the p-type impurity-diffused layers have almost no sensitivity to the shearing strain component $\gamma_{xy}$. On the other hand, when the longitudinal direction of the p-type impurity-diffused layers 15a are aligned in parallel to the <110> of the single crystalline silicon substrate, the layers 15a have the sensitivity to only the normal strain components $\epsilon_x$ and $\epsilon_y$. In other words, the Wheatstone bridge circuit 101 formed of the p-type impurity-diffused layers 15a and the p-type impurity-diffused layers 15b as shown in FIG. 18 serves as a strain sensor having the sensitivity to only the normal strain components $\epsilon_x$ and $\epsilon_y$. Thus, if the strips 17 are provided on both sides of the Wheatstone bridge circuit in the x-axis direction as for example shown in FIG. 18, the sensitivity to the perpendicular stain in the x-axis direction is reduced, and thus the Wheatstone bridge circuit 101 acting as the strain sensor has the sensitivity to only the normal strain in the y-axis direction. Here, if the desired strain-measuring direction is matched to the y-axis direction, the bridge circuit can measure the amount of strain with high precision. The output of the Wheatstone bridge circuit responsive to the change of strain is reduced to about half as compared to the case of using the p-type impurity-diffused layers that constitute the resistors of the bridge of which the longitudinal directions are all aligned in parallel to the <110> direction. However, the area occupied by the whole bridge circuit can be decreased.

In addition, when the slits are provided on both sides of the strain sensor, the amount of the normal strain component in the direction in which the slits oppose becomes the minimum at near the slits and increases with the increase of the distance from the slits toward the center within the region between the slits. Since the Wheatstone bridge circuit 101 has the p-type impurity-diffused layers 15b with no sensitivity to strain as dummy resistors, the p-type impurity-diffused layers 15b are located at about the central area between the slits 17. Then, the p-type impurity-diffused layers 15a that need the reduction of the sensitivity to strain in the x-axis direction are located at near the slits 17. Thus, only the strain in the target measuring-direction can be measured with high precision.

Figure 19:
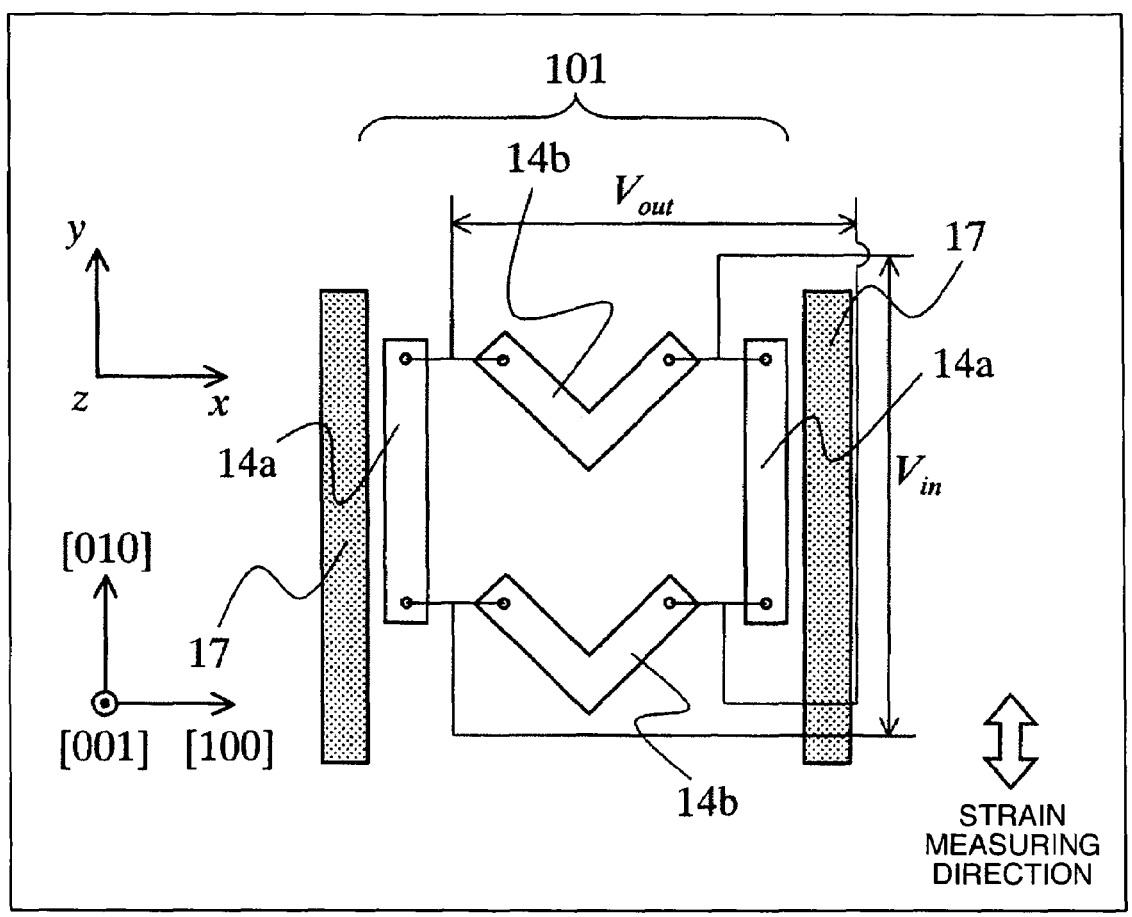
FIG. 19 is a diagram showing the details of another example of the strain sensor of the mechanical-quantity measuring device of the fourth embodiment according to the invention.

FIG. 19 shows a Wheatstone bridge circuit formed of n-type impurity-diffused layers 14a of which the longitudinal direction is parallel to the <100> direction of the single crystalline silicon substrate, and n-type impurity-diffused layers 14b of which the longitudinal direction is parallel to the <110> direction of the single crystal silicon substrate and which are bent by an angle of 90° at the mid point of half resistance. This bridge circuit collectively can also cancel out the outputs due to the shearing strain components as in the previous bridge circuit using the p-type impurity-diffused layers. The bridge circuit using the n-type impurity-diffused layers has its temperature compensation effect somewhat reduced as compared with that using the p-type impurity-diffused layers, but has the effect of having high sensitivity to strain.

Figure 20:
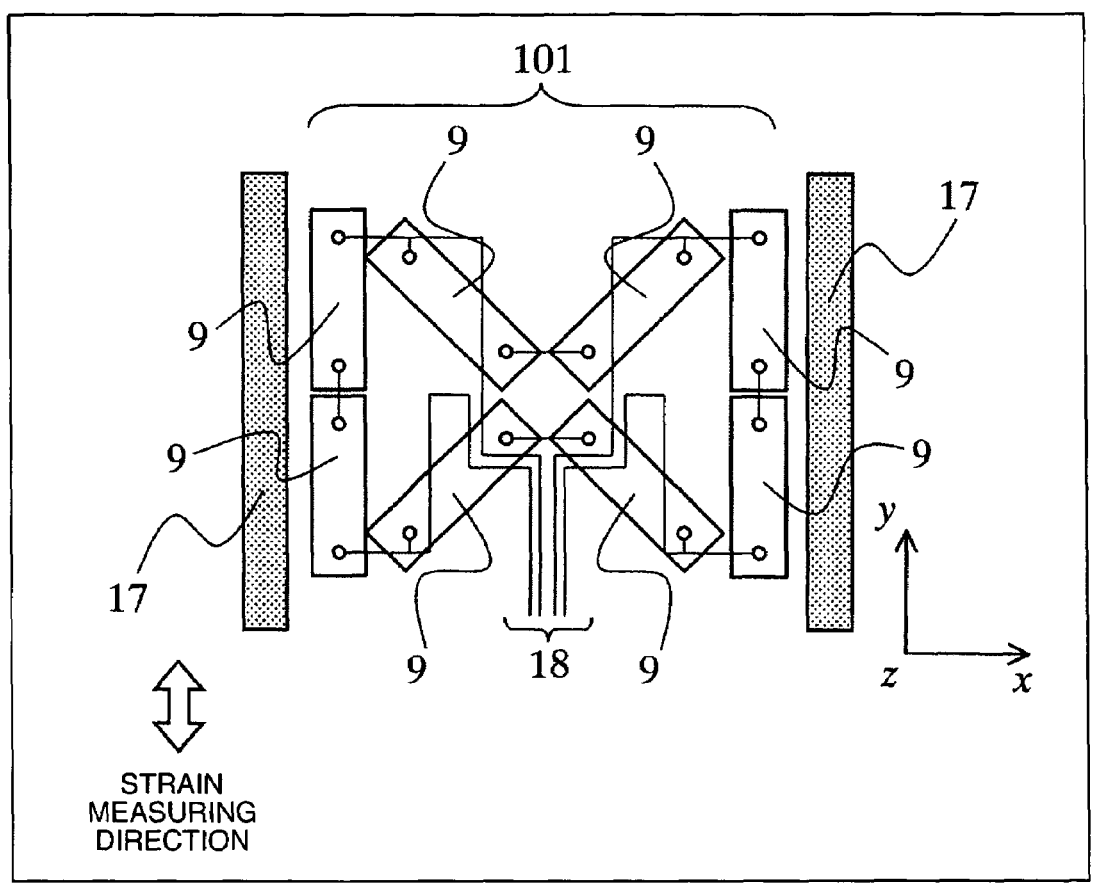
FIG. 20 is a diagram showing another example of the location and wiring method of the strain sensor of the mechanical-quantity measuring device of the fourth embodiment according to the invention.

FIG. 20 shows another example of the resistor arrangement and the wiring conductors connecting the resistors in the Wheatstone bridge circuit shown in FIGS. 18 and 19. The area occupied by the Wheatstone bridge circuit shown in FIG. 20 can be minimized. In addition, the wiring conductors connecting the four resistors are made equal in their lengths, and lead conductors are led out from the mid point of the conductors to the outside. Thus, the resistances of the wiring conductors cannot affect the output offset of the Wheatstone bridge circuit. Moreover, the resistors are actually not bent by an angle of 90° as above but divided, or cut at right angles, and the resistors serving as the active resistors are also divided, or cut to be equal to the resistance values of the 90'-divided resistors so that the number of active resistors can be made equal to that of the 90'-divided resistors.

Figure 21:
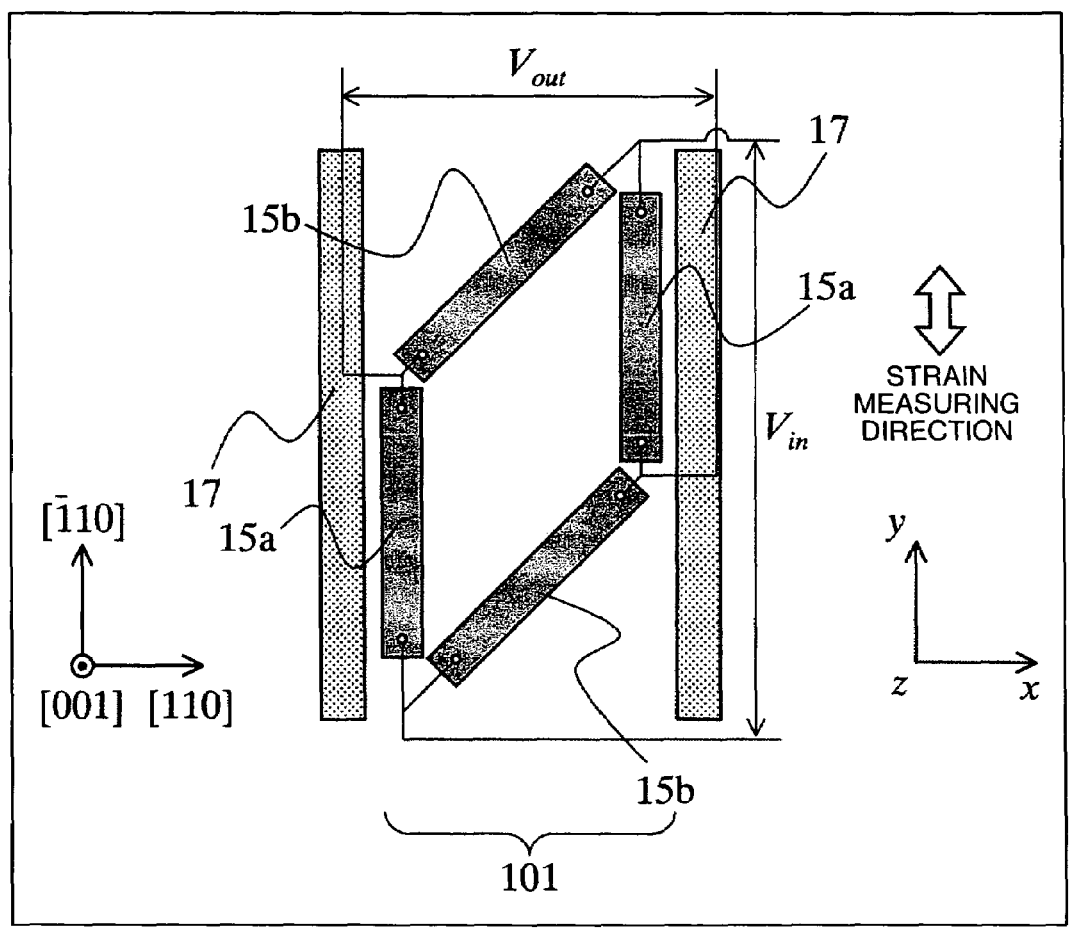
FIG. 21 is a diagram showing the details of another example of the strain sensor of the mechanical-quantity measuring device of the fourth embodiment according to the invention.
Figure 22:
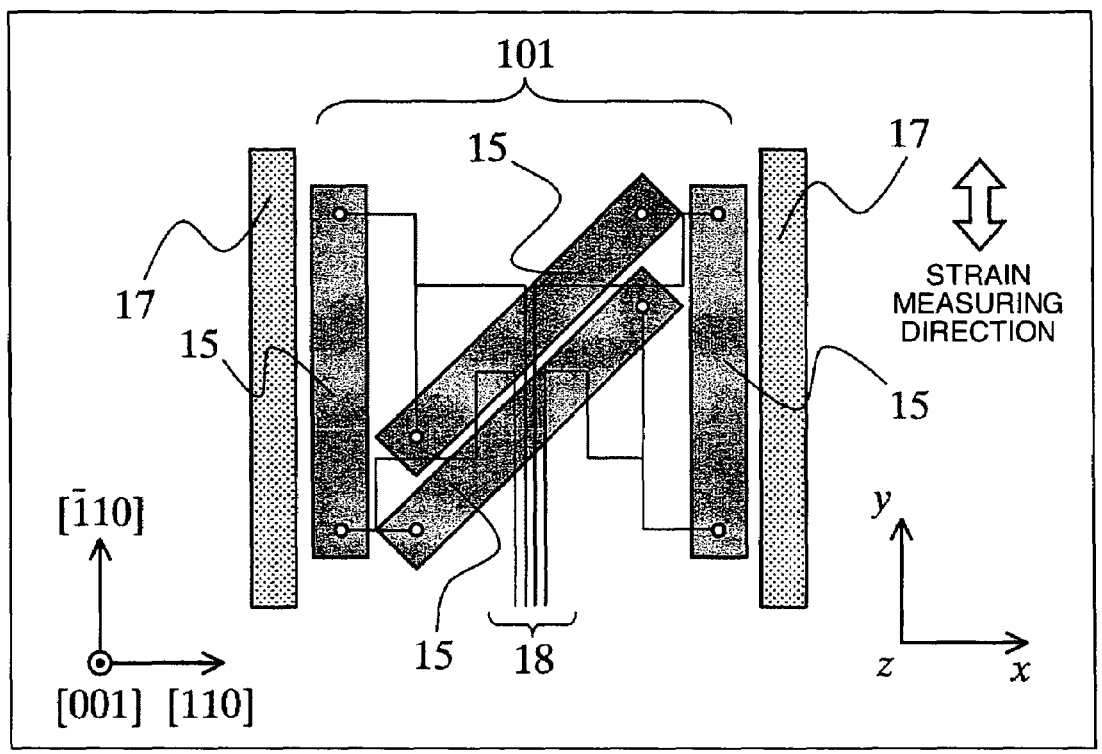
FIG. 22 is a diagram showing another example of the location and wiring method of the strain sensor of the mechanical-quantity measuring device of the fourth embodiment according to the invention.

FIG. 21 shows a Wheatstone bridge circuit formed of p-type impurity-diffused layers 15a of which the longitudinal direction is parallel to the <110> direction of the single crystalline silicon substrate, and p-type impurity-diffused layers 15b of which the longitudinal direction is parallel to the <100> direction of the single crystalline silicon substrate. The p-type impurity-diffused layers 15b have their resistance somewhat changed due to the shearing strain as compared to the case of the 90°-bent layer. However, since they have the same shape as the n-type impurity-diffused layer 15b, the four resistors constituting the Wheatstone bridge circuit 101 can be easily made equal in their resistances, and the amount of the initial offset of the bridge circuit can be reduced. FIG. 22 shows an example of the resistor arrangement and the wiring conductors connecting the resistors in the Wheatstone bridge circuit shown in FIG. 21. In FIG. 22, the area occupied by the Wheatstone bridge circuit is minimized, and the lengths of the wiring conductors connecting the four resistors are made equal. In addition, lead conductors are led out from the mid point of the conductors connecting the resistors to the outside. Thus, the resistances of the wiring conductors do not affect the output offset of the Wheatstone bridge circuit.

In this embodiment, the two opposite resistors of the four resistors constituting the Wheatstone bridge circuit are used as the active resistors having the sensitivity to strain, and the two remaining resistors are used as the dummy resistors, so that the Wheatstone bridge circuit can serve as the two-active type bridge circuit. However, the same effect can be achieved when the Wheatstone bridge circuit is of the one-active type in which one resistor is used as an active resistor and the three remaining resistors as the dummy resistors or of the three-active type in which the three resistors are used as active resistors and the remaining one resistor as a dummy resistor although the sensitivity is somewhat reduced. In addition, the slits 17 are preferably located on both sides of the strain sensor 3, but one slit 17 may be provided on one side of the strain sensor 3, in which case the same effect can be achieved. When the slit 17 is provided on one side, the effect of preferentially measuring the strain in the strain-measuring direction is reduced, but the whole sensor including the strain sensor 3 and the slit 17 can occupy a smaller area. While the slits are mechanically processed in this embodiment, the same effect can be achieved even when an oxidizing process is used to form a region corresponding to the slits on both sides or one side of the strain sensor so that the region can have a lower elasticity than that of the substrate.

In addition, in order to measure the strain with higher sensitivity, the strain sensor 3 should be formed within the area separated more than ⅕ the width of the substrate from the edges of the substrate toward the substrate center on the surface of the single crystalline silicon substrate 8 as in the first embodiment. Moreover, other electronic circuits such as amplification circuits, analog-digital converters, rectifying/detecting circuits and antenna circuits may be provided on the single crystalline silicon substrate 8 within the mechanical-quantity measuring device as well as the strain sensor 3.

Embodiment 5

Figure 23:
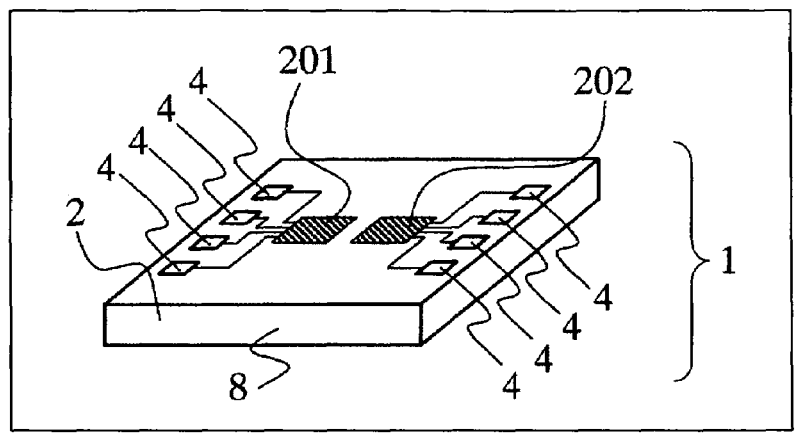
FIG. 23 is a schematic diagram showing the mechanical-quantity measuring device of the fifth embodiment according to the invention.

The fifth embodiment of the invention will be described with reference to FIGS. 23 through 34. FIG. 23 shows an example of the mechanical-quantity measuring device of the fifth embodiment according to the invention. This embodiment has the same structure as the first embodiment. The mechanical-quantity measuring device of this embodiment has formed on the single crystalline silicon substrate 8 a strain sensor having a Wheatstone bridge circuit formed of p-type impurity-diffused layers, and another strain sensor having a Wheatstone bridge circuit formed of n-type impurity-diffused layers at the same time. As previously described about the third embodiment, when a Wheatstone bridge circuit is formed on the same substrate, all the resistors constituting the Wheatstone bridge circuit are affected by strain. Therefore, the active resistor and dummy resistors cannot be definitely distinguished from each other within the bridge circuit, and thus the Wheatstone bridge circuit cannot normally operate.

FIG. 23 shows the mechanical-quantity measuring device 1 having the Wheatstone bridge circuits 101 capable of solving this problem. In the mechanical-quantity measuring device of this embodiment, there are formed on the silicon substrate 8 at least an n-type impurity-diffused layer strain sensor 201 that has a Wheatstone bridge circuit formed of n-type impurity-diffused layers, and a p-type impurity-diffused layer strain sensor 202 that has a Wheatstone bridge circuit formed of p-type impurity-diffused layers.

Figure 24:
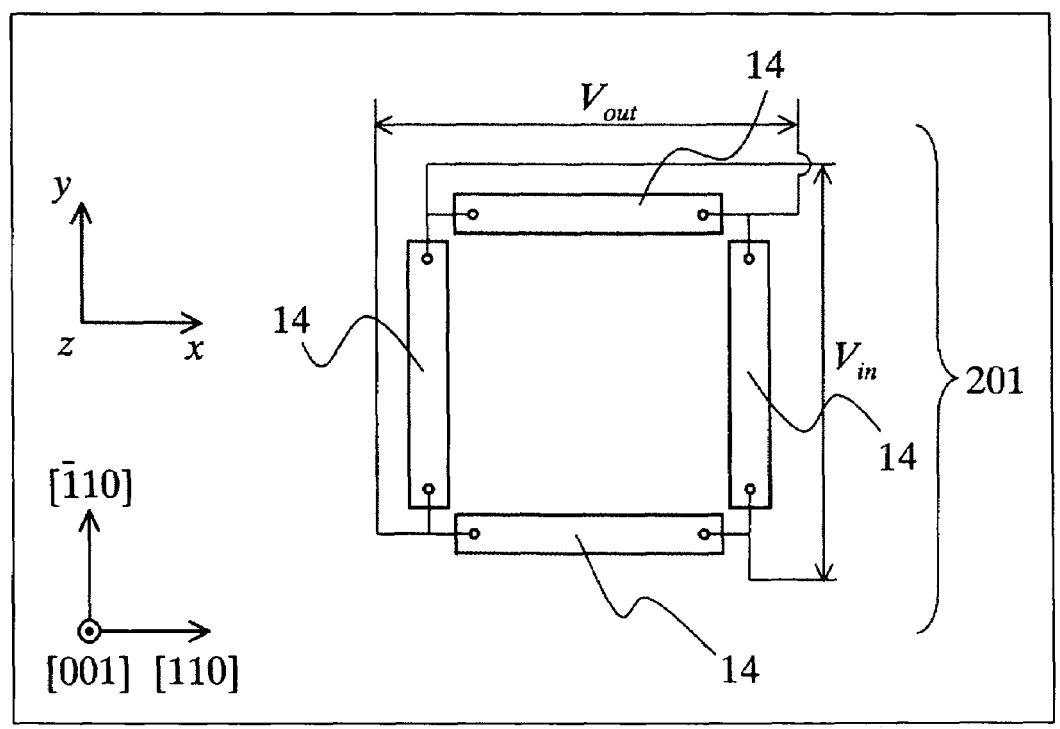
FIG. 24 is a diagram showing the details of an example of the strain sensor of the mechanical-quantity measuring device of the fifth embodiment according to the invention.
Figure 25:
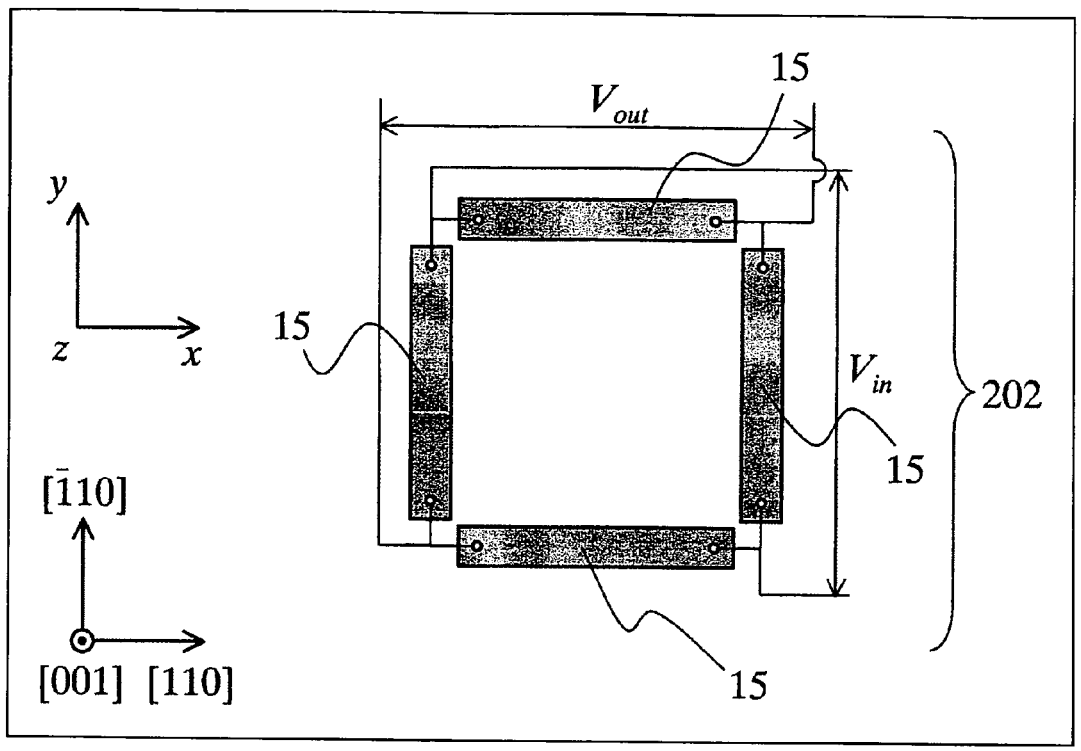
FIG. 25 is a diagram showing the details of another example of the strain sensor of the mechanical-quantity measuring device of the fifth embodiment according to the invention.
Figure 26:
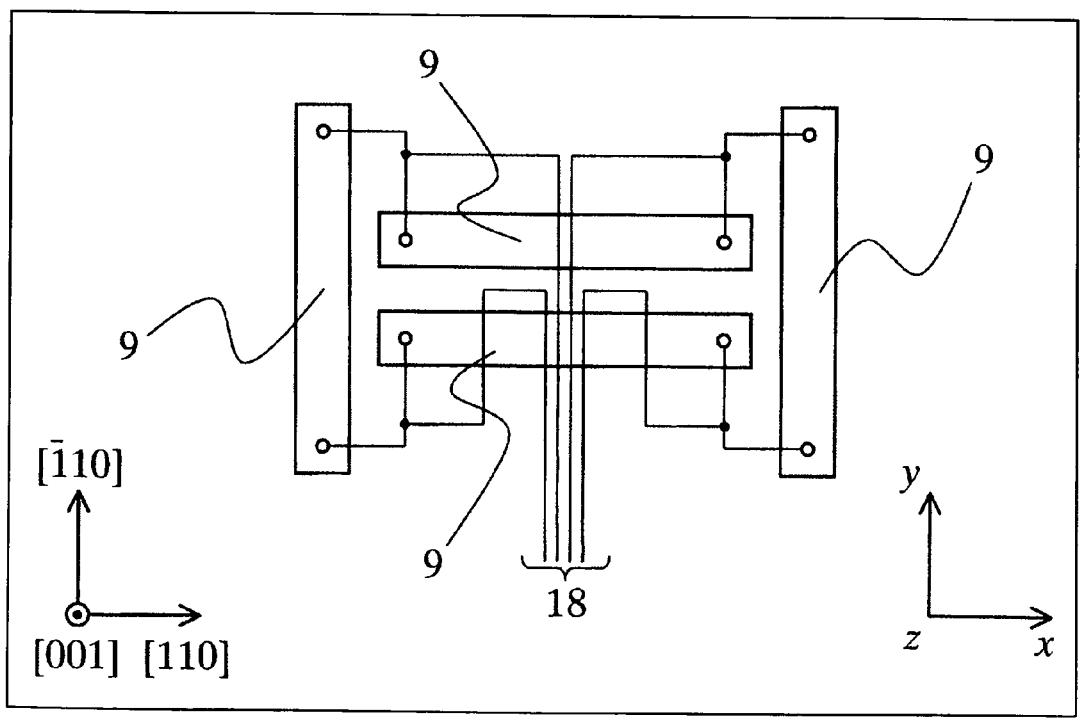
FIG. 26 is a diagram showing an example of the location and wiring method of the strain sensor of the mechanical-quantity measuring device of the fifth embodiment according to the invention.

When impurity-diffused layers are formed on the surface of the silicon substrate with the plane {001} of the silicon crystal being matched to the surface of the silicon substrate, the changes of the resistance values of the impurity-diffused resistors are affected by the strain components in the silicon substrate surface. As described previously about the second embodiment, too, the piezoresistance effect of the semiconductor single crystal has the orthotropic anisotropy dependent on the crystal structure. The impurity-diffused layers exhibit a different resistance change in association with the direction in which the change of resistance due to the current flow in the layer is measured and the crystal orientation of the semiconductor single crystal. In order to use this characteristic, the longitudinal direction of the impurity-diffused resistor, or the direction in which the change of resistance due to the current flow in the layer is measured is aligned in parallel to the <110> plane, or direction of the silicon single crystal, and the x-axis and y-axis of the xy coordinates as a reference for the measurement of strain components are matched to the <110> direction of the silicon single crystal. In this case, the shearing strain component $\gamma_{xy}$ can be eliminated not only from the n-type impurity-diffused layers but also from the p-type impurity-diffused layers. The impurity-diffused layers have the sensitivity to only the normal strain components $\epsilon_x$ and $\epsilon_y$ in the x-axis and y-axis directions. FIG. 24 shows a Wheatstone bridge circuit using the n-type impurity-diffused layers 14 of which the longitudinal direction is parallel to the <110> direction of the silicon single crystal. The Wheatstone bridge circuit shown in FIG. 24 is formed in the {001} plane of the silicon single crystal to have two n-type impurity-diffused layers of which the longitudinal direction is parallel to the <110> direction of the single crystalline silicon substrate, and two n-type impurity-diffused layers of which the longitudinal direction is parallel to the <110> direction and perpendicular to the longitudinal direction of the first-mentioned, or former n-type impurity-diffused layers. As another combination of impurity-diffused layers, the bridge circuit may have one n-type impurity-diffused layer of which the longitudinal direction is parallel to the <110> direction and which has an orientation of a particular direction and three n-type impurity-diffused layers of which the longitudinal direction is parallel to the <110> direction and perpendicular to that of that single n-type impurity-diffused layer. However, the Wheatstone bridge circuit produces an output due to the difference between the resistance values of the four resistors. When the n-type impurity-diffused layers parallel to the <110> direction are used to form the bridge circuit, the longitudinal direction of at least one n-type impurity-diffused layer is required to be in parallel to the <110> direction, and to have an orientation rotated by 90° on the silicon single crystal substrate with respect to the other n-type impurity-diffused layers. When the strain sensor having the Wheatstone bridge circuit shown in FIG. 24 is used to make strain measurement under the condition that a strain is preferentially caused in a particular direction within the measured object, the x-axis or y-axis shown in FIG. 24 is matched to the direction of the caused strain so that the normal strain component in that direction can be measured. However, when multiaxial strains are caused in the measured object with the mechanical-quantity measuring device mounted, the strain sensor of the mechanical-quantity measuring device cannot measure the strain in a particular direction since it is affected by the multiaxial strains. In order to solve this problem, the Wheatstone bridge circuit shown in FIG. 24 and the Wheatstone bridge circuit as shown in FIG. 25 that uses the p-type impurity-diffused layers of which the longitudinal direction is parallel to the <110> direction are built up on the same substrate as shown in FIG. 23. The Wheatstone bridge circuit shown in FIG. 25 is formed of two p-type impurity-diffused layers of which the longitudinal direction is parallel to the <110> direction, and two p-type impurity-diffused layers of which the longitudinal direction is parallel to the <110> direction and perpendicular to the longitudinal direction of the former p-type impurity-diffused layers. As another combination of impurity-diffused layers, it may be formed of one p-type impurity-diffused layer of which the longitudinal direction is parallel to the <110> direction, and three p-type impurity-diffused layers of which the longitudinal direction is parallel to the <110> direction and perpendicular to that single p-type impurity-diffused layer. In the mechanical-quantity measuring device having the strain sensor of the above structure, when the <110> direction of the single crystalline silicon substrate is matched to the xy coordinates as the strain measurement reference, the n-type impurity-diffused layer strain sensor 201 and p-type impurity-diffused layer strain sensor 202 of the mechanical-quantity measuring device produce outputs of $V^n_{out}/V_{in}=a\epsilon_x+b\epsilon_y$ and $V^p_{out}/V_{in}=c\epsilon_x+d\epsilon_y$ that include two variables of normal strain components $\epsilon_x$ and $\epsilon_y$. The coefficients a, b, c and d are characteristic constants determined by the Wheatstone bridge circuit structure and kind of impurity-diffused layers. These coefficients can be previously estimated. By solving the two equations for $\epsilon_x$ and $\epsilon_y$, it is possible to find the orthogonal normal strain components caused in the {001} plane of the single crystalline silicon substrate. FIG. 26 shows an example of the resistor arrangement and wiring method in the Wheatstone bridge circuit using impurity-diffused layers of which the longitudinal direction is parallel to the <110> direction of the single crystalline silicon substrate. As illustrated, the wiring conductors connecting the impurity-diffused resistors within the bridge circuit are made equal in their lengths, and lead conductors are led out from the mid point of the wiring conductors to the outside so that the output under the strain-free condition can be reduced to 0 as far as possible. In addition, the area occupied by the whole bridge is minimized by close arrangement of two opposite impurity-diffused resistors within the bridge.

Figure 27:
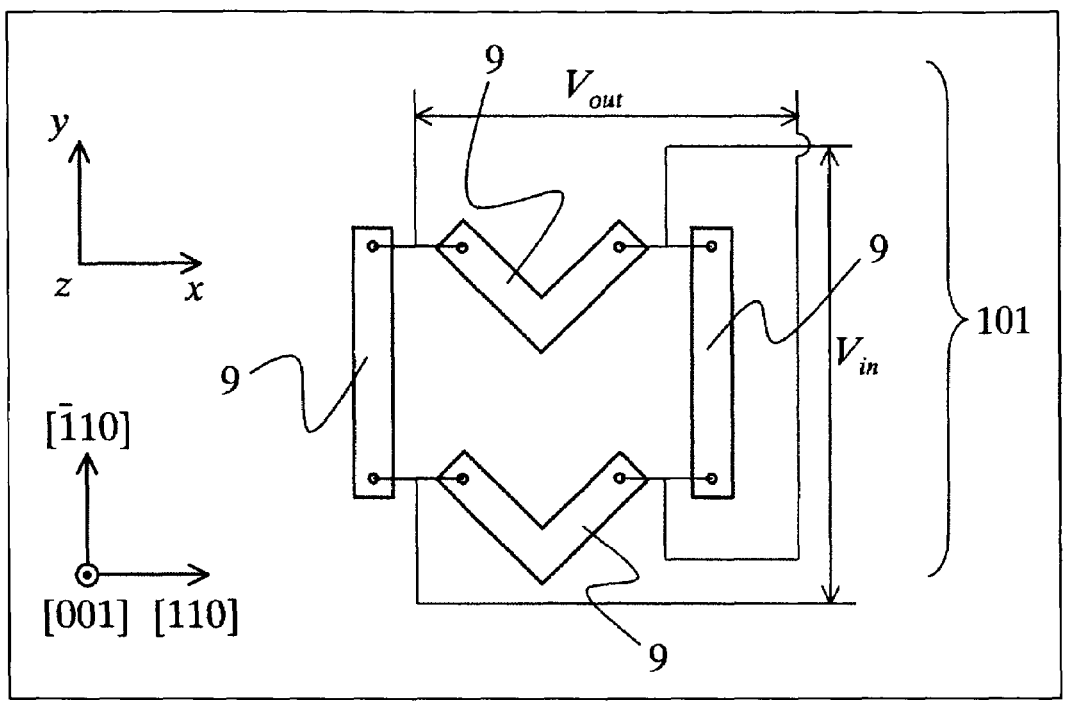
FIG. 27 is a diagram showing the details of another example of the strain sensor of the mechanical-quantity measuring device of the fifth embodiment according to the invention.
Figure 28:
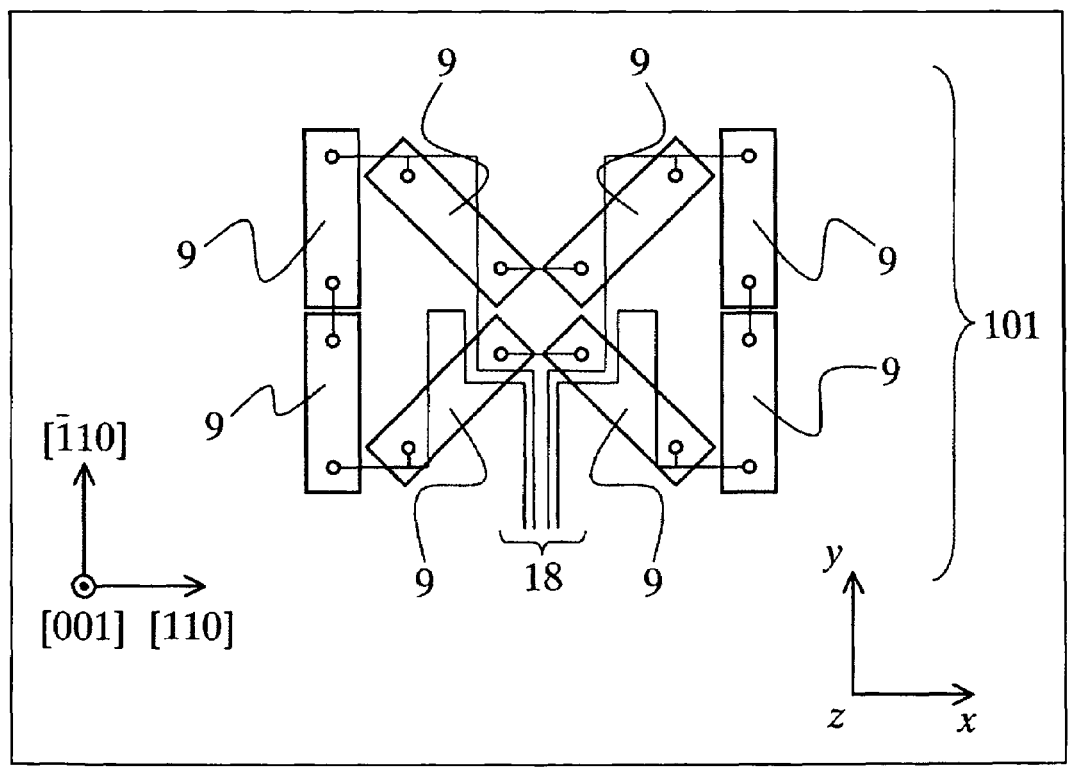
FIG. 28 is a diagram showing another example of the location and wiring method of the strain sensor of the mechanical-quantity measuring device of the fifth embodiment according to the invention.
Figure 29:
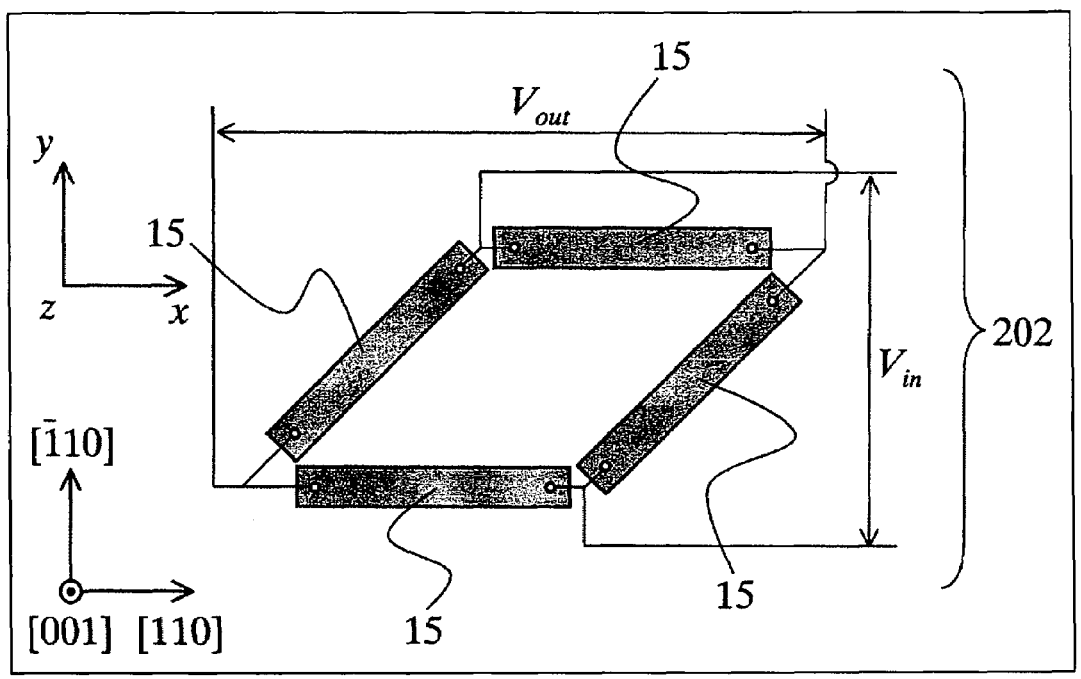
FIG. 29 is a diagram showing the details of another example of the strain sensor of the mechanical-quantity measuring device of the fifth embodiment according to the invention.

In addition, the n-type impurity-diffused layer strain sensor 201 and p-type impurity-diffused layer strain sensor 202, as shown in FIG. 27, may be a combination of impurity-diffused resistors of which the longitudinal direction is parallel to the <110> direction of the single crystalline silicon substrate 8 and impurity-diffused resistors of which the longitudinal direction is parallel to the <100> direction and which are bent by an angle of 90° at the half-resistance point with the xy coordinates matched to the <110> direction of the single crystalline silicon substrate 8. In this case, the Wheatstone bridge circuit 101 has only the normal strain component parallel to the x-axis and y-axis, and produces an output of $V^n_{out}/V_{in}=a\epsilon_x+b\epsilon_y$. Thus, even when the Wheatstone bridge circuit having the shape shown in FIG. 27 is used as the strain sensor, the bridge circuit formed of n-type impurity-diffused layers and the bridge circuit formed of p-type impurity-diffused layers are used so that the normal strain component can be separated from the other strain components. FIG. 28 shows an example of the resistor arrangement and wiring method in the Wheatstone bridge circuit using impurity-diffused layers of which the longitudinal direction is parallel to the <110> direction of the single crystalline silicon substrate and impurity-diffused layers of which the longitudinal direction is parallel to the <100> direction of the silicon substrate. As illustrated, the wiring conductors connecting the impurity-diffused resistors within the Wheatstone bridge circuit are made equal in their lengths, and lead conductors are lead out from the mid point of the conductors to the outside. Moreover, the number of divided resistors bent by an angle of 90° is made equal to that of non-divided resistors so that the output can be made 0 as far as possible when there is no strain. In this arrangement of layers, the sensitivity is reduced to about ½ that of the bridge circuit formed of only the impurity-diffused layers of which the longitudinal direction is parallel to the <110> direction of the single crystalline silicon substrate, but the area occupied by the whole bridge circuit can be made small. In addition, the resistors of which the longitudinal direction is parallel to the <100> direction of the single crystalline silicon substrate and which are bent by an angle of 90° may be bent in the same direction as in FIG. 27 or in the opposite directions as shown in FIG. 28. The arrangement of layers shown in FIG. 27 has the merit that the L-shape resistors can be formed within the minimum area. On the other hand, in the arrangement shown in FIG. 28, since the bridge circuit can be set symmetrical in its shape as a whole, impurity atoms can be diffused with high precision. Thus, the amount of offset of the Wheatstone bridge circuit can be reduced, and the temperature compensation effect can be enhanced. In addition, since the bridge arrangement is symmetrical, the wiring conductors connecting the impurity-diffused resistors can be made equal in their lengths. Thus, the amount of offset can be reduced. Moreover, each of the 90'-bent resistors parallel to the <100> direction of the single crystalline silicon substrate may be a single non-divided resistor as shown in FIG. 27 or a plurality of divided resistors as shown in FIG. 28.

Figure 30:
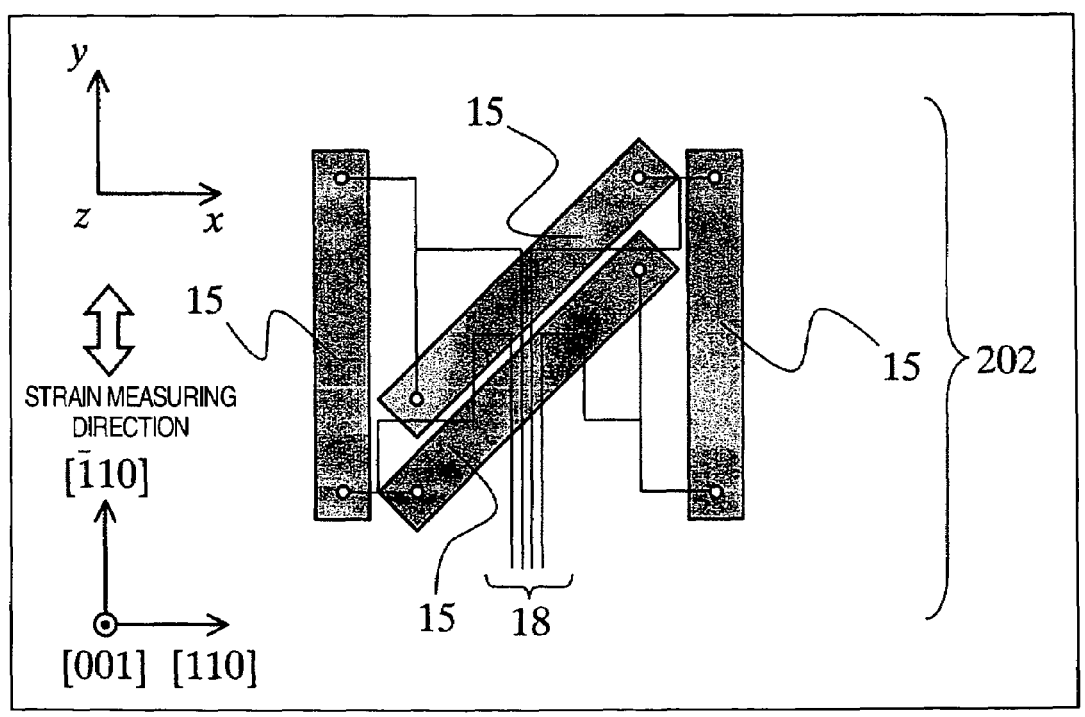
FIG. 30 is a diagram showing another example of the location and wiring method of the strain sensor of the mechanical-quantity measuring device of the fifth embodiment according to the invention.

In addition, when the impurity-diffused layers constituting the bridge circuit are p-type impurity-diffused layers, it is possible to use a combination of impurity-diffused resistors of which the longitudinal direction is parallel to the <110> direction, and impurity-diffused resistors of which the longitudinal direction is parallel to <100> direction of the single crystalline silicon substrate with the xy axes matched to the <110> direction of the single crystalline silicon substrate. In this case, the resistors parallel to the <110> direction of the single crystalline silicon substrate are not bent by an angle of 90°. In the case when p-type impurity-diffused layers are used to form a bridge circuit and the resistors parallel to the <100> direction are not bent, the shearing strain component somewhat affects the output as compared with the case of using the bent resistors. However, this influence is very week, and the bridge circuit has the sensitivity to only the normal strain component chiefly parallel to the x-axis and y-axis as a whole. In this case, since the resistance value can be easily adjusted as compared with the 90°-bent resistors, the four resistors of the bridge circuit can be adjusted with ease, and the amount of offset of the bridge circuit output can be reduced. In addition, while the p-type impurity-diffused layer strain sensor 202 is formed of two impurity-diffused layers of which the longitudinal direction is parallel to the <100> direction, and two impurity-diffused layers of which the longitudinal direction is parallel to the <110> direction in this embodiment, the same effect can be obtained by using a combination of three impurity-diffused layers of which the longitudinal direction is parallel to <100> direction, and one impurity-diffused layer of which the longitudinal direction is parallel to the <110> direction or a combination of one impurity-diffused layer of which the longitudinal direction is parallel to the <100> direction, and three impurity-diffused layers of which the longitudinal direction is parallel to the <110> direction. FIG. 30 shows an example of the resistor arrangement and wiring method in the Wheatstone bridge circuit using p-type impurity-diffused layers of which the longitudinal direction is parallel to the <110> direction of the single crystalline silicon substrate, and p-type impurity-diffused layers of which the longitudinal direction is parallel to the <100> direction of the silicon substrate. As illustrated, the wiring conductors connecting the impurity-diffused resistors within the Wheatstone bridge are made equal in their lengths, and wiring conductors are led out from the mid point of the conductors to the outside so that the output can reach 0 as far as possible when there is no strain. In this arrangement of layers, the area occupied by the whole bridge circuit can be decreased as compared with that of the bridge circuit formed of only the impurity-diffused layers of which the longitudinal direction is parallel to the <110> direction of the single crystalline silicon substrate.

Figure 31:
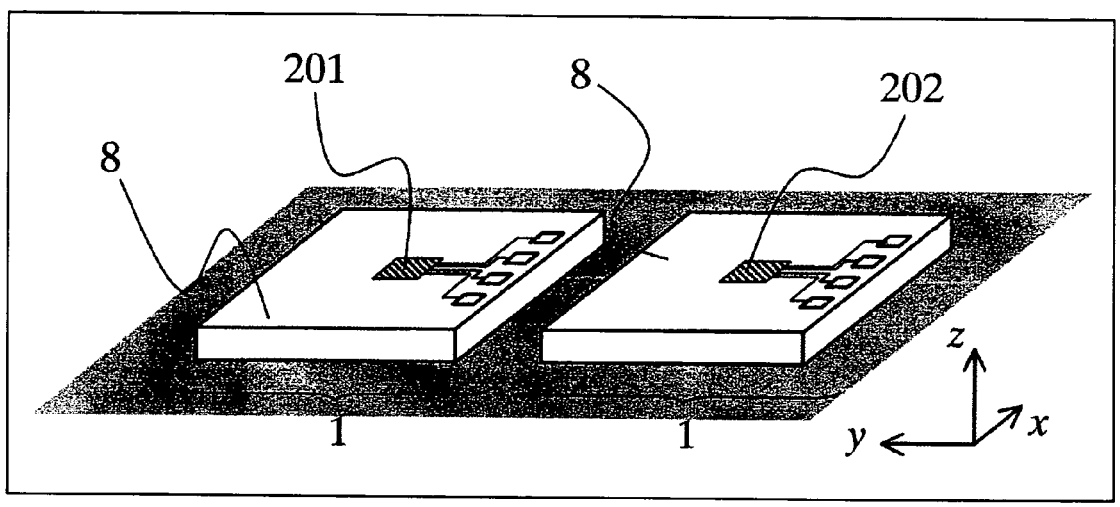
FIG. 31 is a schematic diagram of another example of the mechanical-quantity measuring device of the fifth embodiment according to the invention.

While this embodiment has at least the Wheatstone bridge circuit formed of p-type impurity-diffused resistors and the Wheatstone bridge circuit of n-type impurity-diffused resistors on the single crystalline silicon substrate 8, each of the above Wheatstone bridge circuits does not necessarily use a combination of impurity-diffused layers of the same shape, but may use any one of the combinations of impurity-diffused layers of various shapes shown in this embodiment. Although the impurity-diffused layers are arranged so that their longitudinal directions are parallel to the <110> direction and <100> direction of the single crystalline silicon substrate 8 as described above, this arrangement is ideal. The same effect can be achieved by arranging the impurity-diffused layers so that the longitudinal direction can be made parallel to a direction near to the <110> direction rather than the <100> direction of the silicon single crystal substrate 8 or to a direction near to the <100> direction rather than the <110> direction. In addition, the two bridge circuits shown in FIG. 23 may be formed on the same single crystalline silicon substrate or on separate substrates as shown in FIG. 31.

Figure 32:
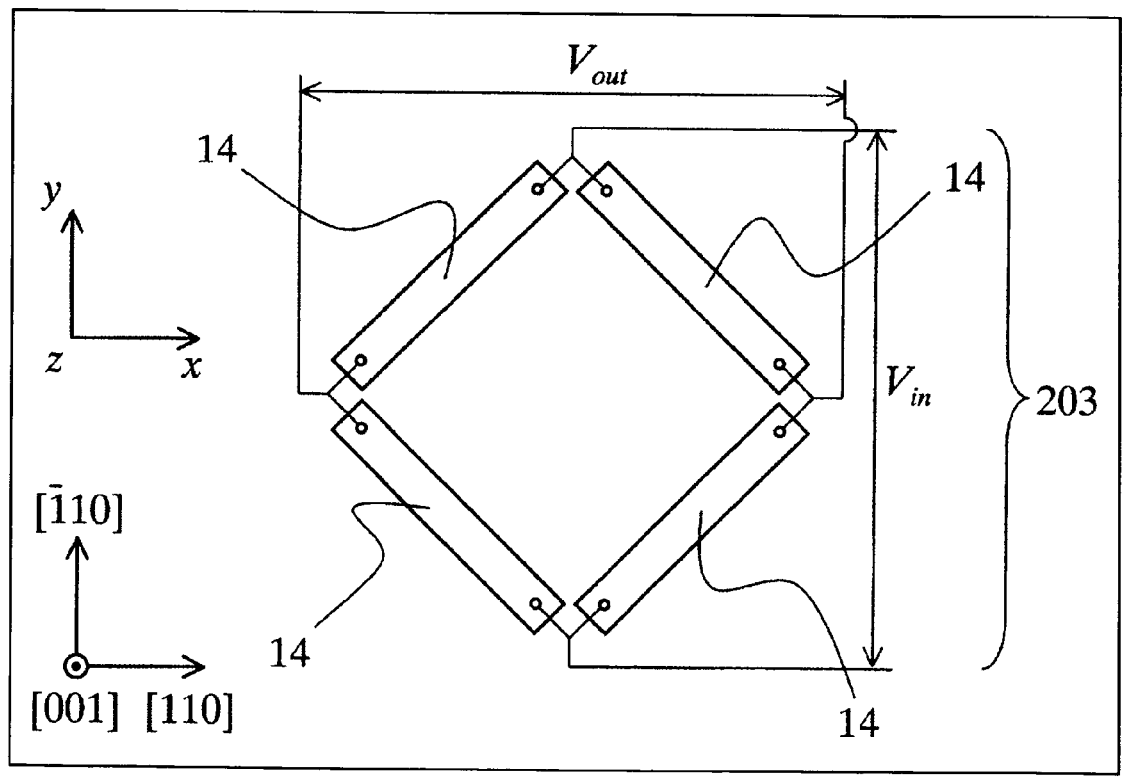
FIG. 32 is a diagram showing the details of another example of the strain sensor of the mechanical-quantity measuring device of the fifth embodiment according to the invention.
Figure 33:
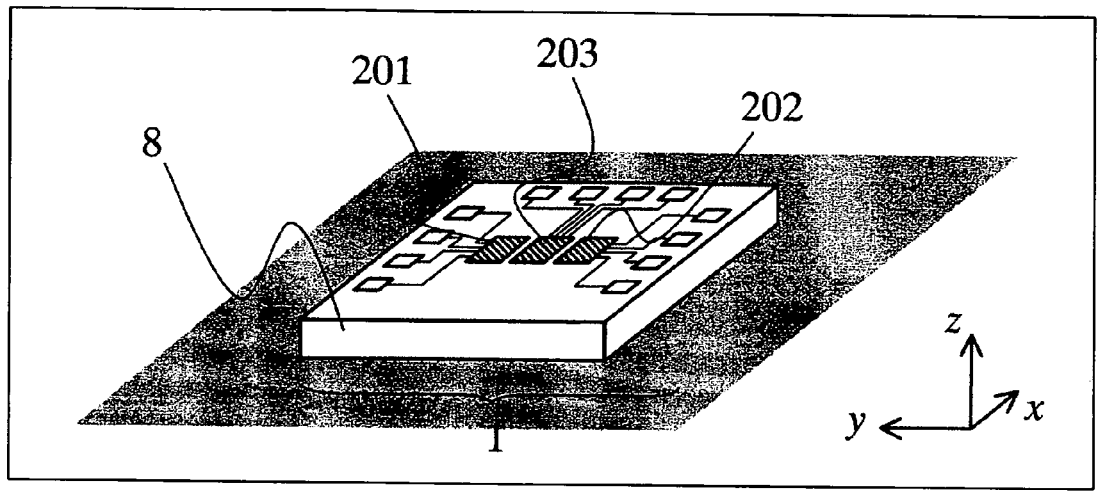
FIG. 33 is a schematic diagram of another example of the mechanical-quantity measuring device of the fifth embodiment according to the invention.
Figure 34:
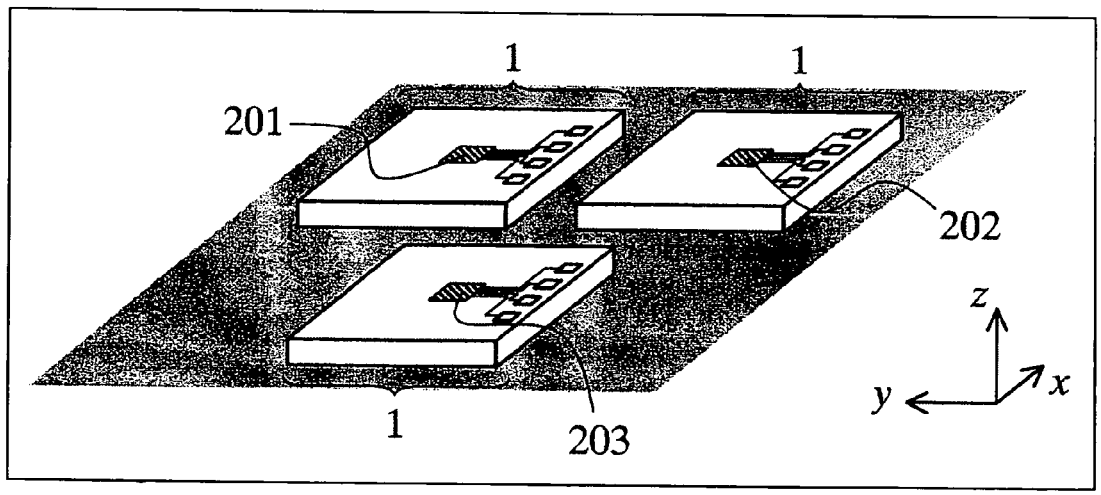
FIG. 34 is a schematic diagram of another example of the mechanical-quantity measuring device of the fifth embodiment according to the invention.

In addition, when the Wheatstone bridge circuit 101 is built up by using the n-type impurity-diffused layers 14 of which the longitudinal direction is parallel to the <100> direction of the single crystalline silicon substrate 8 with the xy axes matched to the <110> direction of the single crystalline silicon substrate 8 as shown in FIG. 32, the Wheatstone bridge circuit 101 can have the sensitivity to only the shearing strain component $\gamma_{xy}$. The mechanical-quantity measuring device 1 having the n-type impurity-diffused layer shearing strain sensor 203, n-type impurity-diffused layer strain sensor 201 and p-type impurity-diffused layer strain sensor 202 arranged on the same single crystalline silicon substrate 8 as shown in FIG. 33 can measure three different strain components on the measured object if the xy axes are matched to the <110> direction of the single crystalline silicon substrate 8. Since the three bridges built on the same substrate can be placed in the same temperature condition, the sensitivities to strain can be compensated with ease, and thus strain measurement can be made with high precision. In addition, the mechanical-quantity measuring device shown in FIG. 33 may use a combination of three chips of one bridge circuit as shown in FIG. 34 or a combination of one chip of two bridge circuits and one chip of one bridge circuit. When separate chips are used, the xy axes are matched to the <100> direction of the single crystalline silicon substrate of the mechanical-quantity measuring device. Thus, the normal strain components $\epsilon_x$ and $\epsilon_y$ in the x-axis and y-axis directions can be measured with high sensitivity. When this mechanical-quantity measuring device is produced as a device for measuring the normal strain components $\epsilon_x$ and $\epsilon_y$, its measurement sensitivity can be improved.

Moreover, in order to measure strain with higher sensitivity, the strain sensor 3 is required to build in the area separated by more than ⅕ the width of the substrate from the edges of the substrate toward the substrate center on the surface of the single crystalline silicon substrate 8 as in the first embodiment. In addition, other electronic circuits such as amplification circuits, analog-digital converters, rectifying/detecting circuits, and antenna circuits may be formed on the single crystalline silicon substrate 8 of the mechanical-quantity measuring device as well as the strain sensor 3.

According to the third, fourth and fifth embodiments, it is possible to achieve a very high temperature compensation effect even if the mechanical-quantity measuring device is operated under an environment of a large temperature variation, and the strain component in a particular direction can be measured with high precision. Since the temperature difference between the resistors constituting the Wheatstone bridge circuit can be decreased if the Wheatstone bridge circuit having the strain sensor is built up on a very small area on the same substrate, the temperature compensation effect of the bridge circuit can be enhanced. In addition, since the resistors constituting the bridge are closely arranged on the same substrate, the resistances of the wiring conductors connecting the resistors can be reduced enough not to affect the output from the bridge circuit. Moreover, since the resistors constituting the bridge circuit are substantially equally formed, and since the piezoresistance effect resistor constituting the Wheatstone bridge circuit can be formed to be very small-sized, it is possible to reduce the amount of current in the strain sensor and suppress the influence of the external noise even under the small amount of current.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mechanical-quantity measuring device having a Wheatstone bridge circuit formed of p-type impurity-diffused layers, and a slit or slits provided on a single side or both sides of said Wheatstone bridge circuit in the direction perpendicular to the strain-measuring direction or a region or regions of a lower elasticity than that of said semiconductor substrate on said single side or both sides of said Wheatstone bridge circuit in the direction perpendicular to the strain measuring direction, said Wheatstone bridge circuit being formed of a combination of p-type impurity-diffused layers built so that the direction in which the resistance change of said p-type impurity-diffused layers due to the current flow in said layers is measured can be made in parallel to the <110> direction of said semiconductor single crystalline substrate, and p-type impurity-diffused layers built so as to measure their resistance change due to the current caused to flow in the direction rotated 90° on said single crystalline substrate from the direction of said current flow in said first-mentioned impurity-diffused layers.

2. A mechanical-quantity measuring device according to claim 1, wherein said Wheatstone bridge circuit is formed of a combination of p-type impurity-diffused layers built so that the direction in which the resistance change of said p-type impurity-diffused layers due to the current flow in said layers is measured can be made in parallel to the <110> direction of said semiconductor single crystalline substrate, and p-type impurity-diffused layers built so that the direction in which the resistance change of said p-type impurity-diffused layers due to the current flow in said layers is measured can be made in parallel to the <100> direction of said semiconductor single crystalline substrate.

3. A mechanical-quantity measuring device having a Wheatstone bridge circuit formed of n-type impurity-diffused layers, and a slit or slits provided on a single side or both sides of said Wheatstone bridge circuit in the direction perpendicular to the strain-measuring direction or a region or regions of a lower elasticity than that of said semiconductor substrate on said single side or both sides of said Wheatstone bridge circuit in the direction perpendicular to the strain measuring direction, said Wheatstone bridge circuit being formed of a combination of n-type impurity-diffused layers built so that the direction in which the resistance change of said n-type impurity-diffused layers due to the current flow in said layers is measured can be made in parallel to the <100> direction of said semiconductor single crystalline substrate, and n-type impurity-diffused layers built so as to measure their resistance change due to the current caused to flow in the direction rotated 90° on said single crystalline substrate from the direction of said current flow in said first-mentioned impurity-diffused layers.

4. A mechanical-quantity measuring device according to claim 3, wherein said n-type impurity-diffused layers built so as to measure their resistance change due to the current caused to flow in the direction rotated 90° in said combination is replaced by n-type impurity-diffused layers so that the direction in which the resistance change of said n-type impurity-diffused layers due to the current flow in said layers is measured can be made in parallel to the <110> direction of said semiconductor single crystalline substrate and that said n-type impurity-diffused layers are bent by an angle of 900 at the mid point of half resistance of said layers on said single crystalline substrate in order to eliminate shearing strain components.

5. A mechanical-quantity measuring device having a Wheatstone bridge circuit formed of p-type impurity-diffused layers, and a slit or slits provided on a single side or both sides of said Wheatstone bridge circuit in the direction perpendicular to the strain-measuring direction or a region or regions of a lower elasticity than that of said semiconductor substrate on said single side or both sides of said Wheatstone bridge circuit in the direction perpendicular to the strain measuring direction, said Wheatstone bridge circuit being formed of a combination of p-type impurity-diffused layers built so that the direction in which the resistance change of said p-type impurity-diffused layers due to the current flow in said layers is measured can be made in parallel to the <110> direction of said semiconductor single crystalline substrate, and p-type impurity-diffused layers built so that the direction in which the resistance change of said p-type impurity-diffused layers due to the current flow in said layers is measured can be made in parallel to the <100> direction of said semiconductor single crystalline substrate and that said p-type impurity-diffused layers are bent by an angle of 90° at the mid point of half resistance of said layers on said single crystalline substrate in order to eliminate shearing strain components.

6. A mechanical-quantity measuring device having at least one Wheatstone bridge circuit formed of p-type impurity-diffused layers and one Wheatstone bridge circuit formed of n-type impurity-diffused layers, any one or both of said Wheatstone bridge circuits being formed of a combination of impurity-diffused layers built so that the direction in which the resistance change of said impurity-diffused layers due to the current flow in said layers is measured can be made in parallel to the <110> direction of said semiconductor single crystalline substrate, and impurity-diffused layers built so as to measure their resistance change due to the current caused to flow in the direction rotated 90° on said single crystalline substrate from the direction of said current flow in said first-mentioned impurity-diffused layers.

7. A mechanical-quantity measuring device having at least one Wheatstone bridge circuit formed of p-type impurity-diffused layers and one Wheatstone bridge circuit formed of n-type impurity-diffused layers, any one or both of said Wheatstone bridge circuits being formed of impurity-diffused layers so that the direction in which the resistance change of said impurity-diffused layers due to the current flow in said layers is measured can be made in parallel to the <110> direction of said semiconductor single crystalline substrate, and impurity-diffused layers built so that the direction in which the resistance change of said impurity-diffused layers due to the current flow in said layers is measured can be made in parallel to the <100> direction of said semiconductor single crystalline substrate and that said impurity-diffused layers are bent by an angle of 90° at the mid point of half resistance of said layers on said single crystalline substrate in order to eliminate shearing strain components.

8. A mechanical-quantity measuring device having at least one Wheatstone bridge circuit formed of p-type impurity-diffused layers and one Wheatstone bridge circuit formed of n-type impurity-diffused layers, said Wheatstone bridge circuit formed of said p-type impurity-diffused layers being formed of impurity-diffused layers built so that the direction in which the resistance change of said impurity-diffused layers due to the current flow in said layers Is measured can be made in parallel to the <110> direction of said semiconductor single crystalline substrate, and impurity-diffused layers built so that the direction in which the resistance change of said impurity-diffused layers due to the current flow in said layers is measured can be made in parallel to the <100> direction of said semiconductor single crystalline substrate.

9. A mechanical-quantity measuring device at least one Wheatstone bridge circuit formed of p-type impurity-diffused layers and two Wheatstone bridge circuits formed of n-type impurity-diffused layers, any one of said Wheatstone bridge circuits formed of said n-type impurity-diffused layers being formed of a combination of n-type impurity-diffused layers built so that the direction in which the resistance change of said impurity-diffused layers due to the current flow in said layers Is measured can be made in parallel to the <100> direction of said semiconductor single crystalline substrate, and impurity-diffused layers built so as to measure their resistance change due to the current caused to flow in the direction rotated 90° on said single crystalline substrate from the direction of said current flow in said first-mentioned impurity-diffused layers so that three strain components within said semiconductor single crystalline substrate can be separated.

* * * * *